US010024752B2

(12) United States Patent
Franklin

(10) Patent No.: US 10,024,752 B2
(45) Date of Patent: Jul. 17, 2018

(54) SYSTEM AND METHOD FOR DETECTING LEAKS

(71) Applicant: INNOVATIVE PRESSURE TESTING, LLC, Fulshear, TX (US)

(72) Inventor: Charles M. Franklin, Katy, TX (US)

(73) Assignee: INNOVATIVE PRESSURE TESTING, LLC, Fulshear, TX (US)

( * ) Notice: Subject to any disclaimer, the term of this patent is extended or adjusted under 35 U.S.C. 154(b) by 0 days.

(21) Appl. No.: 15/479,725

(22) Filed: Apr. 5, 2017

(65) Prior Publication Data

US 2017/0205309 A1    Jul. 20, 2017

Related U.S. Application Data

(63) Continuation of application No. 14/296,976, filed on Jun. 5, 2014, which is a continuation-in-part of application No. 13/769,037, filed on Feb. 15, 2013, now Pat. No. 8,756,022, which is a continuation of application No. 12/833,216, filed on Jul. 9, 2010, now Pat. No. 8,380,448.

(60) Provisional application No. 61/234,736, filed on Aug. 18, 2009, provisional application No. 61/311,863, filed on Mar. 9, 2010.

(51) Int. Cl.
*G01K 15/00*  (2006.01)
*G01M 3/28*  (2006.01)

(52) U.S. Cl.
CPC ................................ *G01M 3/2815* (2013.01)

(58) Field of Classification Search
CPC ..... G01M 3/3263; G01M 3/2815; G01M 3/00

USPC ...................................................... 702/51, 99
See application file for complete search history.

(56) References Cited

U.S. PATENT DOCUMENTS 3,604,256 A    9/1971  Prats
4,269,061 A    5/1981  Hatsuno et al.
(Continued)

FOREIGN PATENT DOCUMENTS

DE    2916550 A1    10/1979
GB    2450905 A     1/2009
(Continued)

OTHER PUBLICATIONS

Canadian Patent Application No. 2,926,187 Office Action dated Oct. 21, 2016 (3 pages).
(Continued)

*Primary Examiner* — Stephanie Bloss
(74) *Attorney, Agent, or Firm* — Conley Rose, P.C.

(57) ABSTRACT

A method includes receiving a result of a benchmark leak detection test for a pressure system and determining whether the result indicates that a leak is present in the pressure system. In response to the result of the benchmark leak detection test indicating that a leak is not present in the pressure system, the method includes performing a subsequent leak detection test for the pressure system, comparing a result of the subsequent leak detection test to the result of the benchmark leak detection test, and determining, based on the comparison, whether the subsequent leak detection test indicates that a leak is not present in the pressure system. A time to determine whether a leak is not present based on the comparison is less than a time to determine whether a leak is not present based on the benchmark leak detection test.

22 Claims, 10 Drawing Sheets

(56) References Cited

U.S. PATENT DOCUMENTS

| | | | |
|---|---|---|---|
| 4,383,436 A | 5/1983 | Hailey | |
| 4,441,357 A | 4/1984 | Kahn et al. | |
| 4,608,857 A | 9/1986 | Mertens et al. | |
| 4,826,482 A | 5/1989 | Kamen | |
| 4,899,573 A | 2/1990 | Dimmick et al. | |
| 4,947,352 A | 8/1990 | Jenkins | |
| 5,078,006 A | 1/1992 | Maresca, Jr. et al. | |
| 5,090,234 A | 2/1992 | Maresca, Jr. et al. | |
| 5,163,314 A | 11/1992 | Maresca, Jr. et al. | |
| 5,189,904 A | 3/1993 | Maresca, Jr. et al. | |
| 5,375,455 A | 12/1994 | Maresca, Jr. et al. | |
| 5,526,679 A | 6/1996 | Filippi et al. | |
| 5,586,050 A | 12/1996 | Makel et al. | |
| 5,948,969 A | 9/1999 | Fierro et al. | |
| 6,082,182 A | 7/2000 | Fierro et al. | |
| 6,082,184 A | 7/2000 | Lehmann | |
| 6,244,100 B1 | 6/2001 | Hastings et al. | |
| 6,279,383 B1* | 8/2001 | Balke | G01M 3/2876 73/40 |
| 6,311,548 B1 | 11/2001 | Breidenbach et al. | |
| 6,370,942 B1 | 4/2002 | Dunfee et al. | |
| 6,549,857 B2 | 4/2003 | Fierro et al. | |
| 6,557,530 B1 | 5/2003 | Benson et al. | |
| 6,655,422 B2 | 12/2003 | Shock | |
| 6,804,991 B2 | 10/2004 | Balschat et al. | |
| 7,216,533 B2 | 5/2007 | McGregor et al. | |
| 7,231,811 B2* | 6/2007 | Sagi | G01M 3/3254 702/51 |
| 8,380,448 B2 | 2/2013 | Franklin | |
| 9,207,143 B2 | 12/2015 | Franklin et al. | |
| 9,518,461 B2 | 12/2016 | Franklin et al. | |
| 2002/0120411 A1* | 8/2002 | Fierro | G01M 3/2815 702/51 |
| 2005/0011252 A1 | 1/2005 | Arima et al. | |
| 2005/0222698 A1 | 10/2005 | Eryurek et al. | |
| 2006/0032550 A1 | 2/2006 | Wodjenski | |
| 2006/0167400 A1 | 7/2006 | Ellingboe et al. | |
| 2006/0235448 A1 | 10/2006 | Roslin et al. | |
| 2008/0185143 A1 | 8/2008 | Winters et al. | |
| 2008/0223111 A1* | 9/2008 | McDonald | G01M 3/2815 73/37 |
| 2008/0266125 A1 | 10/2008 | Windisch et al. | |
| 2009/0012726 A1* | 1/2009 | Furuse | G01M 3/007 702/51 |
| 2009/0018782 A1* | 1/2009 | Sameda | G01F 9/008 702/45 |
| 2009/0132185 A1 | 5/2009 | Furuse | |
| 2009/0322544 A1 | 12/2009 | McDowell | |
| 2010/0153027 A1 | 6/2010 | Bredau et al. | |
| 2010/0288883 A1* | 11/2010 | Rivot | B64D 37/005 244/135 R |
| 2010/0313958 A1* | 12/2010 | Patel | E03B 7/071 137/1 |
| 2011/0025511 A1 | 2/2011 | Wien | |
| 2011/0046903 A1 | 2/2011 | Franklin | |
| 2012/0150455 A1 | 6/2012 | Franklin et al. | |
| 2012/0265456 A1 | 10/2012 | Snow et al. | |
| 2013/0226475 A1 | 8/2013 | Franklin | |
| 2014/0111327 A1 | 4/2014 | Naidu et al. | |
| 2014/0288858 A1 | 9/2014 | Franklin | |
| 2015/0128693 A1 | 5/2015 | Franklin et al. | |
| 2015/0354346 A1 | 12/2015 | Franklin et al. | |
| 2015/0354347 A1 | 12/2015 | Franklin et al. | |

FOREIGN PATENT DOCUMENTS

| | | | |
|---|---|---|---|
| JP | 2002243572 A | 8/2002 | |
| JP | 2009092585 A | 4/2009 | |
| WO | 01/84103 A1 | 11/2001 | |
| WO | 01/88549 A1 | 11/2001 | |
| WO | 03/046502 A1 | 6/2003 | |

OTHER PUBLICATIONS

Canadian Patent Application No. 2,926,288 Office Action dated Oct. 21, 2016 (3 pages).
Canadian Patent Application No. 2,926,187 Response to Office Action dated Oct. 21, 2016 filed Mar. 27, 2017 (2 pages).
Canadian Patent Application No. 2,926,288 Response to Office Action dated Oct. 21, 2016 filed Mar. 31, 2017 (2 pages).
European Patent Application No. 10810332.6 extended European search report dated Oct. 29, 2015 (7 pages).
European Patent Application No. 13895570.3 extended European search report dated Apr. 28, 2017 (9 pages).
European Patent Application No. 13895777.4 extended European search report dated Apr. 28, 2017 (9 pages).
International Patent Application No. PCT/US2010/041478 Preliminary Report on Patentability dated Mar. 1, 2012 (10 pages).
International Patent Application No. PCT/US2010/041478 International Search Report dated Feb. 14, 2011 (3 pages).
International Patent Application No. PCT/US2013/065413 International Search Report and Written Opinion dated Jul. 11, 2014 (12 pages).
International Patent Application No. PCT/US2013/065419 International Search Report and Written Opinion dated Jul. 11, 2014 (12 pages).
U.S. Appl. No. 14/296,976 Final Office Action dated Apr. 13, 2017 (17 pages).
U.S. Appl. No. 12/833,216 Office Action dated Jun. 15, 2012 (6 pages).
U.S. Appl. No. 13/291,895 Office Action dated Jun. 19, 2014 (26 pages).
U.S. Appl. No. 14/655,513 Office Action dated Jul. 14, 2017 (19 pages).
U.S. Appl. No. 14/655,543 Office Action dated Jul. 14, 2017 (17 pages).
U.S. Appl. No. 13/769,037 Office Action dated Sep. 18, 2013 (8 pages).
U.S. Appl. No. 13/291,895 Office Action dated Dec. 18, 2014 (9 pages).
U.S. Appl. No. 13/291,895 Response to Office Action dated Jun. 19, 2014 filed Sep. 19, 2014 (13 pages).
U.S. Appl. No. 13/769,037 Response to Office Action dated Sep. 18, 2013 filed Dec. 17, 2013 (8 pages).
U.S. Appl. No. 13/291,895 Response to Office Action dated Dec. 18, 2014 filed Mar. 18, 2015 (13 pages).
U.S. Appl. No. 14/296,976 Office Action dated Dec. 6, 2016 (16 pages).
U.S. Appl. No. 14/296,976 Response to Office Action dated Dec. 6, 2016 filed Mar. 6, 2017 (20 pages).
U.S. Appl. No. 14/296,976 Response to Final Office Action dated Apr. 13, 2017 filed Sep. 13, 2017 (15 pages).
Canadian Patent Application No. 2,926,187 Office Action dated Sep. 8, 2017 (4 pages).
Canadian Patent Application No. 2,926,288 Office Action dated Sep. 8, 2017 (4 pages).
U.S. Appl. No. 14/296,976 Office Action dated Oct. 24, 2017 (13 pages).
U.S. Appl. No. 14/296,976 Response to Office Action dated Oct. 24, 2017 (10 pages).
U.S. Appl. No. 14/655,513 Response to Office Action dated Jul. 14, 2017 (10 pages).
U.S. Appl. No. 14/655,543 Response to Office Action dated Jul. 14, 2017 (11 pages).
European Patent Application No. 13895570.3 Examination Report dated Feb. 27, 2018 (5 pages).
European Patent Application No. 13895777.4 Examination Report dated Mar. 8, 2018 (7 pages).

* cited by examiner

SYSTEM AND METHOD FOR DETECTING LEAKS

PRIORITY CLAIM

This application is a continuation of U.S. patent application Ser. No. 14/296,976 filed Jun. 5, 2014, entitled "System and Method for Detecting Leaks," which is a continuation-in-part of U.S. patent application Ser. No. 13/769,037 filed Feb. 15, 2013, now U.S. Pat. No. 8,756,022, issued Jun. 17, 2014, entitled "System and Method for Detecting Leaks," which is a continuation of U.S. patent application Ser. No. 12/833,216 filed Jul. 9, 2010, now U.S. Pat. No. 8,380,448, issued Feb. 19, 2013, entitled "System and Method for Detecting Leaks," which claims the benefit of and priority to U.S. Provisional Patent Application No. 61/234,736 filed Aug. 18, 2009 and entitled "System and Method for Detecting Leaks," and U.S. Provisional Patent Application No. 61/311,863 filed Mar. 9, 2010 and entitled "System and Method for Detecting Leaks," each being incorporated by reference herein in its entirety for all purposes.

FIELD

Embodiments of the present disclosure relate to systems and methods for detecting leaks and for testing the pressure integrity of a pressure system, examples of which includes various systems configured to hold and or transport fluids, such as liquids and gases. Non-limiting examples of such pressure systems include pipelines, storage containers, hydraulic/fluid lines, valves, seals, and other similar systems designed to retain a fluid, whether a gas, a liquid, or combination thereof.

BACKGROUND

Tubes, valves, seals, containers, tanks, receivers, pressure vessels, pipelines, conduits, heat exchangers, and other similar components, are typically configured to retain and/or transport fluids under pressure. For purposes of this application, these different components are referred to as a pressure system and comprise one or more of the above components and their equivalents and, optionally, include other components. A non-limiting example of a pressure system includes a pipeline for transporting natural gas or other hydrocarbons. Another non-limiting example is a natural gas and/or oil well and/or wells of other types, whether being actively drilled or already producing, that typically transports fluids from the producing geological formation to a well head. Such a well includes one or more of the following components: a Christmas tree or well head; production tubing; casing; drill pipe; blowout preventers; completion equipment; coiled tubing; snubbing equipment; and other similar and typical components. Yet another non-limiting example includes hydraulic and fuel lines of various types for transporting fluids for use in mechanical devices. Yet another non-limiting example includes storage containers for retaining fluids therein. Other pressure systems fall within the scope of the disclosure.

The fluids retained or transported within pressure systems typically include one or more gases, liquids, or combinations thereof, including any solid components entrained within the fluid. As one non-limiting example, a typical fluid comprises methane or natural gas, carbon dioxide, hydrogen sulfide, natural gas liquids, water, and the like. Another non-limiting example is crude oil, which typically includes methane, propane, octane, and longer-chained hydrocarbons, including heavy oil/asphaltenes. Yet another non-limiting example is hydraulic fluid within a hydraulic line.

Pressure systems and/or the individual components that comprise the system, typically are tested to ensure that the pressure system is not leaking and/or the pressure system is capable of maintaining pressure integrity. For example, a pressure system typically is tested to provide assurance that the fluid system is capable of retaining the fluid held therein at a selected pressure (e.g., a rated working pressure or a pre-determined test pressure) without the fluid leaking or escaping from the pressure system.

It is understood that in connection with fluids and gases that exhibit a potentially significant change in pressure as a function of the fluid's temperature, it can be difficult to determine whether a change in pressure, typically, although not necessarily, a decrease in pressure, in a pressure system is merely a result of the change in temperature of the fluid, or if it is a result of a leak somewhere within the pressure system. For example, a fixed volume of a synthetic drilling fluid in a suitable container/pressure vessel used in oil and gas drilling exhibits a decreasing pressure as a function of a decreasing temperature. Depending on the drilling fluid involved, the pressure can vary significantly with temperature. In deep-water offshore drilling fluid temperature during pressure testing is impacted by several factors, including but not limited to ambient temperatures above and below sea-level, heat introduced into the fluid from the pumping system (friction) and pressure increase. Once the pressure system is isolated from analysis, the temperature begins to stabilize, often changing rapidly at first as the fluid temperature can differ significantly from its ambient surrounding and environment. This change in temperature, as previously noted, also results in a corresponding change in pressure, typically presenting as a decreasing pressure as heat introduced from pressurization dissipates. A problem is to distinguish this decrease in pressure caused by the decrease in temperature from a decrease in pressure caused by a leak within the pressure system that is allowing the fluid held therein to escape.

To solve this problem of distinguishing the cause of the decrease in pressure, operators of pressure systems will hold a test pressure within the pressure system for a significant period of time until a steady-state test pressure (i.e., one in which the test pressure changes very little with time) is reached. That is, it may be only after a steady-state pressure is reached that an operator might be assured that a decrease in pressure was a result of the fluid cooling via a transfer of heat from the fluid to the sea and/or other surrounding media rather than because of a leak.

The result is that significant and, often unnecessary, time is spent performing the leak/pressure tests. This is very expensive because the tests could take from 12 to 24 hours to complete when, for example, an offshore drilling vessel or rig may lease for $800,000 per day or more. Thus, significant savings in time and money can be made if a more efficient and accurate system and method of detecting leaks is found.

Other methods, including those that require complex mathematical techniques that calculate an equation to fit observed data, and the like, have been proposed to reduce the time it takes to conduct a leak/pressure test. These older tests, however, typically rely on models that require accurate entry of various details of the pressure system, meticulous test protocols that must be adhered to strictly; and highly trained personal. In turn, such systems can be impractical in many applications.

Thus, there exists a need for a system that can accurately perform a leak/pressure test, particularly for fluids that demonstrate a change in pressure with a change in temperature, that is simple and does not require complex models or sufficient data to perform complex computations.

SUMMARY

It is to be understood that the present disclosure includes a variety of different versions or embodiments, and this Summary is not meant to be limiting or all-inclusive. This Summary provides some general descriptions of some of the embodiments, but may also include some more specific descriptions of other embodiments.

Embodiments of the present disclosure are directed to a method including receiving a result of a benchmark leak detection test for a pressure system and determining whether the result indicates that a leak is present in the pressure system. In response to the result of the benchmark leak detection test indicating that a leak is not present in the pressure system, the method includes performing a subsequent leak detection test for the pressure system, comparing a result of the subsequent leak detection test to the result of the benchmark leak detection test, and determining, based on the comparison, whether the subsequent leak detection test indicates that a leak is not present in the pressure system. A time to determine whether a leak is not present based on the comparison is less than a time to determine whether a leak is not present based on the benchmark leak detection test.

Other embodiments of the present disclosure are directed to a system including a pressure sensor coupled to a pressure system that generates data indicative of a pressure value of the pressure system and a computing device coupled to the pressure sensor. The computing device comprises a processor to execute a leak detection program and memory to store pressure data of the pressure system as a function of time. The leak detection program determines whether a result of a benchmark leak detection test for the pressure system indicates that a leak is present in the pressure system. In response to the result of the benchmark leak detection test indicating that a leak is not present in the pressure system, the leak detection program compares a result of a subsequent leak detection test to the result of the benchmark leak detection test and determines, based on the comparison, whether the subsequent leak detection test indicates that a leak is present in the pressure system. A time to determine whether a leak is not present based on the comparison is less than a time to determine whether a leak is not present based on the benchmark leak detection test.

Yet other embodiments are directed to a non-transitory computer-readable medium that contains instructions that, when executed by a processor, cause the processor to perform one or more of the methods disclosed herein.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present disclosure are set forth in the attached figures and in the Detailed Description as provided herein and as embodied by the claims. It should be understood, however, that this Summary does not contain all of the aspects and embodiments of the present disclosure, is not meant to be limiting or restrictive in any manner, and that the invention(s) as disclosed herein is/are and will be understood by those of ordinary skill in the art to encompass obvious improvements and modifications thereto.

Additional advantages of the present disclosure will become readily apparent from the following discussion, particularly when taken together with the accompanying drawings.

BRIEF DESCRIPTION OF THE DRAWINGS

To further clarify the above and other advantages and features of the present disclosure, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

The drawings are not necessarily to scale.

DETAILED DESCRIPTION

As used herein, the term "state"—as in "passing state" or "failing state"—refers to the state of a computing device when a particular constraint is satisfied. For example, a computing device may be in a passing state when passing constraints are met and may be in a failing state when failing constraints are met. Further, being in a passing state does not necessarily indicate that a test has been passed and being in a failing state does not necessarily indicate that a test has been failed; in some cases, additional constraints must be satisfied in the passing state for the test to be passed and additional constraints must be satisfied in the failing state for the test to be failed.

As used herein, the terms "rate of change," "slope," and "first derivative" all refer to the same characteristic of a value.

As used herein, the terms "curvature" and "second derivative" all refer to the same characteristic of a value.

Figure 1:
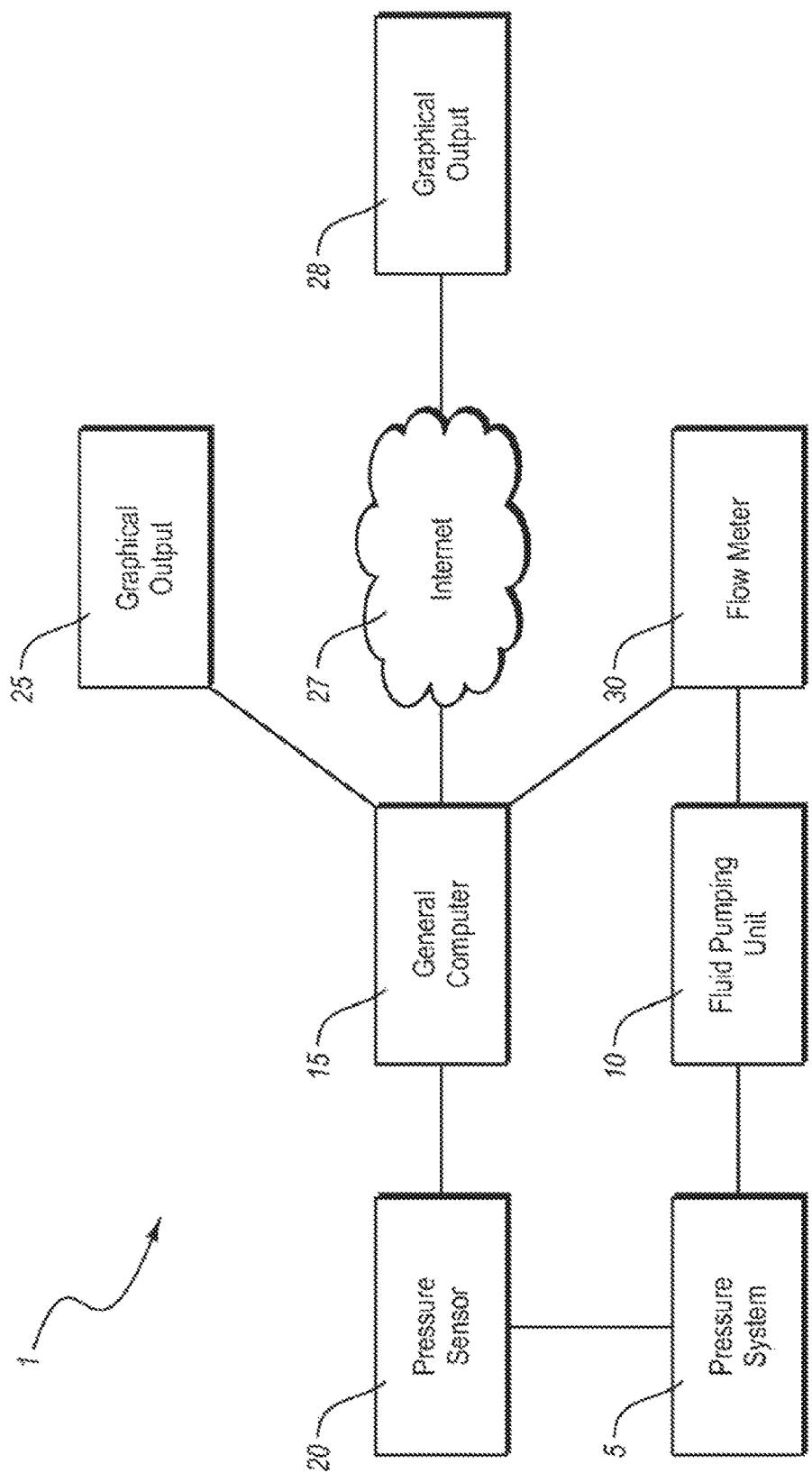
FIG. 1 is a block diagram of an embodiment of the leak detection system.

A block diagram of an embodiment of the leak detection system 1 of the present disclosure is illustrated in FIG. 1. The leak detection system 1 includes a pressure system 5.

Tubes, valves, seals, containers, vessels, heat exchangers, pumps, pipelines, conduits, and other similar components, are typically configured to retain and/or transport fluids within these items. For purposes of this application, these different components are referred to as a pressure system 5 and comprise one or more of the above components and their equivalents and, optionally, other components. A non-limiting example of a pressure system includes a pipeline for transporting natural gas or other hydrocarbons or other fluids. Another non-limiting example is a natural gas or oil well, CO2 well, water well, disposal well and the like, whether being actively drilled or already producing, that typically includes one or more of the following components: a Christmas tree or well head; production tubing; casing; drill pipe; blowout preventers; and other components in the fluid system necessary or appropriate for use in an oil well drilling or production system, as well as the sub-components of each of those items that optionally can be hydraulically isolated and individually tested, and, in some instances, can include the open hole (i.e., uncased) wellbore and the surrounding rock or geological formation. Yet another non-limiting example includes hydraulic and fuel lines of various types for transporting fluids for use in mechanical devices. Yet another non-limiting example includes storage containers for retaining fluids therein. Other pressure systems for transporting or retaining fluids fall within the scope of the disclosure.

The fluids retained or transported within embodiments of the pressure systems 5 typically include one or more gases, liquids, or combinations thereof, including any solid components entrained within the fluid. As one non-limiting example, a typical fluid comprises one or more of methane, natural gas, carbon dioxide, hydrogen sulfide, natural gas liquids, and the like. Another non-limiting example is crude oil, which typically includes methane, propane, octane, and longer-chained hydrocarbons, including heavy oil/asphaltenes. In example of an exploration oil or gas well, the fluids typically include drilling fluids, lost circulation materials, various solids, drilled formation solids, and formation fluids and gases. Yet another non-limiting example is hydraulic fluid within a hydraulic line. Other examples of such fluids include test fluids specifically chosen for the test, including, but not limited to, viscosified water. Other fluids, whether liquid or gas, fall within the scope of the disclosure.

A fluid pumping unit 10 is an optional component of the leak detection system, non-limiting examples of which include cementing units, pumps of various types (e.g., centrifugal, duplex, triplex, positive displacement, eductors) powered by any suitable source of power such (e.g., hydraulic, electric, mechanical). The fluid pumping unit 10 is coupled to the pressure system 5. The fluid pumping unit 10 is configured to supply a selected volume of a test fluid from a source or reservoir of fluid to the pressure system 5. The test fluid, as noted, optionally is selected specifically for the test, such as viscosified water, or a fluid of the type already present in the pressure system 5, or other combinations thereof. The selected volume of test fluid depends, in part, on the size or total volume of the pressure system 5, and can be from small amounts, such as microliters for laboratory equipment, to large amounts, such as barrels (i.e., 42 gallons per barrel) and more, for large pressure systems, as might be expected with pipelines and oil and gas wells. Adding the test fluid to the pressure system 5 raises the pressure at which the fluid within the pressure system 5 is confirmed, such that a test pressure (i.e., the pressure within the pressure system after the test fluid is added to the pressure system) at $time_1$ is greater than the initial pressure of the fluid in the pressure system 5 at $time_0$.

Optionally, a flow meter 30, such as a venturi flow meter, pressure flow meter, stroke counter (calibrated to the volume/stroke of a given positive displacement pump), impeller flow meters, and the like and as appropriate, are coupled to the fluid pumping unit 10 to sense the amount of fluid being added to the pressure system 5. The flow meter 30 optionally displays a signal reflective of the flow of the fluid, such as a flow rate, via gauges and/or digital displays. The flow meter 30 optionally transmits a signal reflective of the flow rate to a general purpose computer 15, typically via sensor cables. While FIG. 1 shows the flow meter transmitting a signal via sensor cables, it is contemplated that the flow meter 30 can be configured to transmit the signal wirelessly and even to be connected to the Internet for transmission to a remote general purpose computer 15 configured to receive wireless and/or Internet signals.

The leak detection system 1 also includes at least one pressure sensor 20 coupled to the pressure system 5. The pressure sensor 20 is configured to sense an initial pressure of the fluid within the pressure system 5 at an $initial\ time_0$ as well as at subsequent times over an interval 'n' of time out to $time_{(n+1)}$. The pressure sensor 20 optionally displays a signal reflective of the pressure of the fluid within the pressure system 5, via gauges and/or digital displays. The pressure sensor 20 transmits a signal reflective of the pressure to a general purpose computer 15, typically via sensor cables, although it is contemplated that the pressure sensor 20 can be configured to transmit the signal wirelessly. Of course the signals can be sent through a hard wired system, a wireless system, or by other suitable means such as through the Internet to the general purpose computer 15 if it is so configured. The pressure sensor 20 is typically selected for the particular operating conditions, such as a pressure and temperature range that is expected for the fluid within the pressure system 5. For example, a pressure sensor 20 selected for use in a pressure system that is part of an oil well could be capable of sensing pressure in a range from 0 to 15,000 pounds per square inch. A non-limiting example of such a pressure sensor 20 include the Models 509, 709, and 809 Pressure Transducers available from Viatran, a Dynisco Company, of Grand Island, N.Y. Other pressure sensors 20 suitable for the pressure and temperature conditions expected to be encountered within the pressure system 5 also fall within the scope of this disclosure.

Embodiments of the leak detection system also include a general purpose computer 15. A general purpose computer 15 can include laptop computers, desktop computers, netbook and tablet computers, personal digital assistants, calculators (programmable and otherwise), and other similar devices and can be located at the testing site or remote from the site. The general purpose computer 15 is configured to accept and store an operating program configured to receive data reflective of pressure and temperature and to manipulate and present that data as a function of time on a computer readable medium, such as a hard drive, flash memory, data tapes, jump drives, remote storage, such as cloud computing with a data server or servers, and the like and for further delivery to the user in a suitable visual/readable format. Optionally, the general purpose computer 15 is configured to receive and transmit data wirelessly or over an Internet connection 27 that is, in turn, connected to another graphical output 28 and/or general purpose computer described in further detail below. Other embodiments of the disclosure include a specific purpose computer configured to process the pressure signals from the sensor 20, rather than a general purpose computer 15. The specific purpose computer will have an operational program recorded onto a specific instruction computer chip, such as a programmable read only memory, externally programmable read only memory, externally erasable programmable read only memory, and/or hard-wired into a specific instruction computer chip.

Embodiments of the operating program as will be described in further detail below are configured to calculate a leak detection value, which is a function of a variance of the first pressure at $time_0$ and the test pressure at $time_1$, the test pressure at $time_1$ and the test pressure at $time_2$, and so on for given one and/or more intervals of time 'n' to a test pressure at the $time_n$ and the test pressure at the $time_{(n+1)}$. A benefit of this previously unknown method is its relative simplicity and accuracy.

Embodiments of the leak detection system 1 also include a graphical output 25 coupled to the general purpose computer 15. The graphical output 25 is any suitable device configured to display to the user the temperature and pressure data, as well as the leak detection value as a function of time, such as a chart or graph. Non-limiting examples of a suitable visual include scatterplots, line graphs, and circular chart recorders that emulate analog circular chart recorders. Examples of the graphical output include monitors, printouts generated by a printer, web pages that have had the leak detection value(s) transmitted to them via a server or other Internet connection coupled to the general purpose computer 15, or any other kind or type of dedicated display and/or dumb terminals.

As mentioned above, the test pressure exhibits a change in pressure with time as an effect of a temperature of the fluid (both the test fluid and the first fluid) changes with time. In other words, the test pressure changes over a time interval $time_0$ to a $time_{(n+1)}$, regardless of whether a leak or leaks are present within the pressure system, and often changes at an exponential rate. This effect is particularly noticeable with synthetic fluids composed of long chain hydrocarbon molecules that are compressible to a modest degree under pressure. The net effect is that it can be difficult to determine quickly whether a decrease in pressure is caused by a leak or caused merely by the decrease in pressure as the drilling fluid cools and the thermal compression effect lessens. As a result, and as will be illustrated, it is a typical practice to hold the pressure system at an elevated pressure for extended periods of time until a steady state pressure has been reached. In other words, the temperature and, hence, the pressure of the fluid within the drilling system has reached a relatively constant steady state. In large pressure systems, such as pipelines and oil or gas wells, it might take more than an hour for the pressure system to reach a steady state pressure such that requirements for testing such systems are satisfied. It should be noted that it is presently understood that certain existing test requirements do not require the tests to occur for such extended period, only that the uncertainty caused by the temperature and compressibility effects cause operators to extend the period of the test to ensure a valid reading that satisfies testing requirements. As a result, it has been observed that significant time is wasted that might otherwise be avoided if a test were available that could quickly evaluate the pressure system and account for the temperature and compressibility effects without need for elaborate models, complex algorithms, detailed and strict test plans, and the like.

An operating program for the general purpose computer 15 (or as hardwired on a silicon chip in a specific computer), utilizes an equation as follows:

$$\text{Leak Detection Value} = \left(1 - \frac{Pressure_{time0}}{Pressure_{time1}}\right) \times 100$$

It will be understood that multiplying the value by 100 creates a value greater than one, rather than a decimal value less than one, and, therefore, is optional depending on a user's preference. From the above, it can be seen that the leak detection value is a function of the variance of a pressure of a fluid in the pressure system plus the additional, selected volume of the test fluid added to the pressure system at first $time_0$ and the pressure at a second time. The general purpose computer reads these values as stored in the computer readable medium, which were previously sent by the pressure sensor. Of course, it will be understood that the operating program can read the data and calculate the leak detection value nearly simultaneously with the measurement of the pressure by the pressure sensor or, in other words, in real-time. Once a single leak detection value is calculated, it is stored in the computer readable medium for future use and recall, either as displayed on the graphical output or to be used in additional calculations. The leak detection value is then calculated for subsequent time intervals and test pressures, such as at $time_2$ and at $time_3$ and through the test pressure at the $time''$ and at $time_{(n+1)}$, the test pressures at each of those times typically exhibiting a pressure lower than that in the immediately preceding periods and exhibiting an approximately exponential rate of decease (within the limits of error and noise in the measurement of the test pressure by the pressure sensor).

The time interval at which pressure is sensed or measured must occur at a rate that captures pressure differential changes that allow effective analysis, and in typical industrial environments, this interval may be, for example, every second. Intervals may vary for various applications and could depend on factors such as pressures, fluids and volumes. The span of time used to determine the leak detection value typically occurs over a relatively short period of time, every 15 seconds, 30 seconds, 60 seconds and the like. Of course, other intervals and spans of time may be selected and fall within the scope of this disclosure. It is contemplated that the test pressure data acquired and stored in the computer readable medium optionally undergoes some form of data smoothing or normalizing processes to eliminate spikes or data transients. For example, one may use procedures to perform a moving average, curve fitting, linear regressions and other such data smoothing techniques, prior to or part of using it to calculate a leak detection value. This allows for a smoother and, potentially, more readable and accurate representation of the leak detection value with less noise from mechanical or electrical interference, spurious signals, or any other unmanageable and unpredictable influences creating erratic data.

Embodiments of the method include providing the components described above, namely, a pressure system 5, a fluid pumping unit 10, a general purpose computer 15, at least one pressure sensor 20, and a graphical output 25, as described above, and, optionally, an Internet or wireless connection 27 connected to another graphical output 28, and a flow meter 30 coupled to the fluid pumping unit 10.

Figure 7:
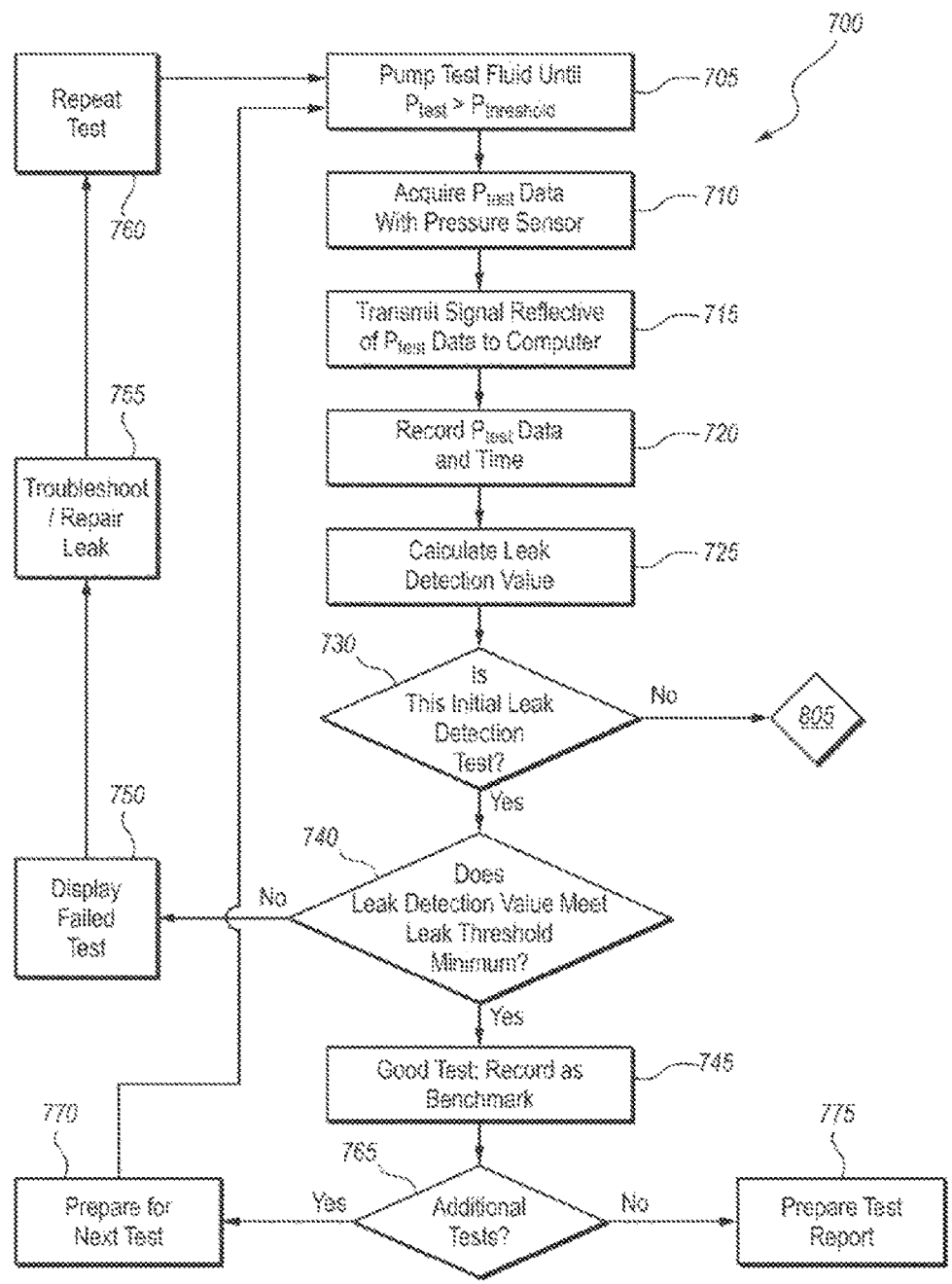
FIG. 7 is a flow chart of an embodiment of the method of detecting leaks.
Figure 8:
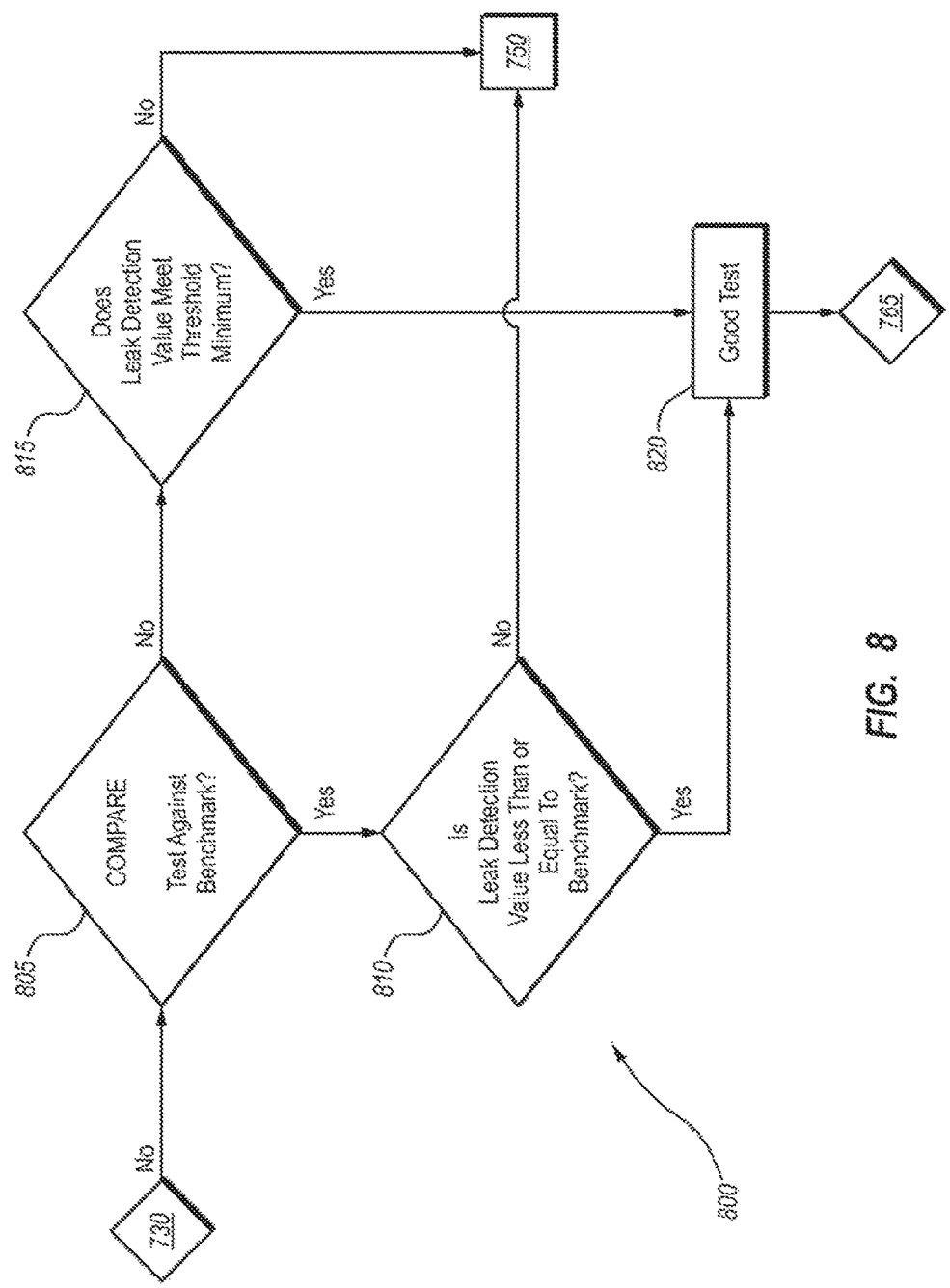
FIG. 8 is a continuation of the flow chart in FIG. 7 of an embodiment of the method of detecting leaks.

To conduct a leak detection test and calculate the leak detection value, reference is made to the flow charts 700 and 800 in FIGS. 7 and 8. The fluid pumping unit 10 is coupled to the pressure system 5 so that the fluid pumping unit 10 can pump or introduce a selected volume of test fluid into the pressure system 5, as represented at box 705 in FIG. 7, such that fluid within the pressure system 5 is at test pressure, or Ptest, that is at or above a minimum pressure threshold, or Pthreshold. The pressure system should maintain P test without leaking. It is understood that the pressure system 5 may already have a volume of fluid at an initial pressure below a test pressure within the pressure system 5 and, therefore, the pressure system 5 requires only an additional, small amount of test fluid to be added. Alternatively, the fluid pumping unit 10 is capable of filling the pressure system 5 in its entirety to its test pressure.

Optionally, as the fluid pumping unit 10 is pumping the test fluid into the pressure system, the flow meter 30 senses the flow rate and/or determines the volume of the test fluid pumped into the pressure system 5 and transmits a signal reflective of those values to the general purpose computer 15 for recording and storage on the computer readable medium, typically with an associated time stamp or other data. Optionally, if the flow rate is sensed or detected and transmitted to the general purpose computer 15, the general purpose computer 15 can be configured to calculate the total volume pumped. Other methods to determine flow rate and/or volume include the use of simple analog or digital stroke counters connected to the fluid pumping unit 10, from which the flow rate and the volume of test fluid pumped can be calculated in the general purpose computer. The flow rate and the total volume of the test fluid can also be displayed on the graphical output 25, along with other optional data.

The pressure sensor 20 can sense the pressure of the fluid within the pressure system 5 and transmit a signal reflective of the pressure to the general purpose computer 15 before, during, and after the fluid pumping unit 10 pumps the test fluid into the pressure system 5, as represented at boxes 710, 715, and 720. The operating program can be configured to automatically and/or continuously record on the computer readable medium the pressure data (and other data as discussed above) once a certain threshold value is reached, such as a minimum pressure, flow rate, volume pumped, and the like, or continuously. Alternatively, it is contemplated that a user manually starts the program and/or instructs it to begin recording the data upon entering a command to do so. As previously noted the pressure data (and other data) may be averaged, normalized and/or smoothed prior to displaying and/or using it to calculate the leak detection value. The data optionally is displayed on the graphical output 25 or transmitted wirelessly and/or through an Internet connection 27 to another graphical output 28.

The operating program calculates the leak detection value in accordance with the formula above for a selected time interval, as noted at box 725. In one embodiment, the computer can be configured to continuously calculate and/or recalculate a leak detection value that is the variance of the test pressure at time 0 and the test pressure at time 1 subtracted from unity and multiplied by 100 to generate a leak detection signal reflective of the leak detection value. In another embodiment, the leak detection value is a function of a variance of the test pressure at $time_1$ and the test pressure at $time_2$; the test pressure at $time_2$ and the test pressure at $time_3$; through the test pressure at the $time_n$ and the test pressure at said $time_{(n+1)}$. The leak detection values may also be smoothed, such as by averaging (e.g., 3-point moving average), curve fitting, normalizing techniques, continuous averaging techniques and/or otherwise smoothed. The leak detection values optionally are recorded to the computer readable medium, typically with an associated time stamp. In addition, the leak detection values are optionally displayed as raw data and/or as a graphical plot or chart on the graphical output 25.

Step or box 730 requests a decision for the question of whether this is the initial leak detection test conducted on the pressure system 5. If it is the initial leak detection test, measurements of the test pressure typically are taken for a selected period of time, such as five, ten, 15 minutes, or longer, depending on the pressure system 5, to ensure a valid test and to characterize the pressure decrease and the leak detection value as a function of time. In other words, the selected volume of test fluid is held within the pressure system 5 until the test is concluded and the additional fluid and/or pressure introduced into the pressure system to conduct the test is bled off or released.

If the decision at box 730 of FIG. 7 is "No", and this is not the initial leak detection test, then the decision as to the significance of the calculated leak detection value is determined using the flow chart 800 in FIG. 8 and, more specifically, box 805, which is discussed in detail below.

If the decision at box 730 is "Yes", i.e., this is the initial leak detection test, then the process proceeds to box 740. In this step, the general purpose computer 15 is configured to determine whether the leak detection value calculated in box 725 meets a certain leak threshold or minimum that is preset by the user. For example, it might be that a leak detection value of less than 1 or 3 (e.g., a rate of change of pressure measured in PSI) indicates a valid test. That is, any decrease in the pressure of the pressure system 5 as measured by the pressure sensor 20 during which the test fluid is being pumped or held within the pressure system 5 is typically the result of the temperature and compressibility effects of the fluid rather than an indication of a leak within the pressure system 5. To avoid dealing with the confusion of "negative numbers: the leak detection value can be manipulated so that it will always be a positive number. Thus the leak detection value can be multiplied by a coefficient or other factor, to always output a positive value (such as by multiplying any negative results by −1), for example. Other manipulation of the leak detection value falls within the scope of disclosure. Further, other threshold minimums for the leak detection value may be selected depending upon the type of pressure system 5 being tested. For example, laboratory equipment that uses very small volumes of fluid might have a lower threshold value, such as 0.05 because the effect of the temperature gradient on such small volumes is proportionally greater. This threshold value can be observed on a plot or chart with a display of the calculated leak detection values as output on the graphical display, or it may be a simple pass/fail type display, or other similar type of output. Preferably the values are displayed graphically.

If the leak detection value meets the minimum leak threshold value, i.e., box 740 is answered "Yes", box 745 indicates that operating program records this as a good test and the leak detection values are recorded as a benchmark by which future leak detection tests of the same or similar components are evaluated.

In the next step 765, the method operates to determine whether there are additional leak detection tests to be conducted on the pressure system 5, such as when testing individual components of a pressure system 5 that are capable of being hydraulically isolated from other components of the pressure system 5. An example of such an instance is the testing of a blowout preventer on an oil well, as blowout preventers typically include one or more annular rams and one or more pipe, blind, and/or shear rams, each of which can be hydraulically isolated and tested separately from the other components of the blowout preventer.

If no additional tests are contemplated, a leak detection test report, such as a summary of the data, the outcome of the test or tests, and associated graphs and/or plots can be prepared for storage on the computer readable medium and/or output via the graphical display, whether onscreen or as a hard copy printed out, and/or transmitted either wirelessly or via the Internet to another graphical display. This step is indicated at box 775.

If additional leak detection tests are contemplated, indicated as box 770, preparations for the next test are made and the process begins anew, as indicated at box 705.

Turning back to box 740, if the leak detection value does not meet the minimum threshold value to indicate a passed test, i.e., the leak detection value indicates that a leak is present or some other factor is causing the pressure system 5 to lose pressure more rapidly than can be accounted through temperature and compressibility effects, then the decision turns to box 750 that notes to display "Failed Test." This failure can be observed on a plot or chart with a display of the calculated leak detection values as output on the graphical display, or it may be a simple pass/fail type display, or other output that provides an indication perceivable or detectable by the user. Typically, the failure is also recorded in the computer readable medium so that the result optionally can be recalled and compared to leak tests that occurred previously, perhaps weeks and months ago or even longer. Of course storage in the memory allows for comparison with tests that occur in the future.

Box or step 755 indicates that the source of the leak or the cause of the loss of pressure is trouble shot and/or repaired, with the leak detection test repeated at step 760, as indicated by the return to the beginning of the method at box 705.

Turning back to the decision at step 730, i.e., whether this is the initial leak detection test, if the answer is "No" the method then proceeds to decision or diamond 805 as indicated on the flow chart 800 in FIG. 8. As this particular test is a subsequent test, i.e., not the initial leak detection test, decision step 805 compares the leak detection value with or against the initial leak detection values stored as a benchmark in step 745.

When the leak detection value is compared against the benchmark and produces a result where the leak detection value is less than or equal to the benchmark, the general purpose computer produces a result that is displayed or communicated to the user indicating that the test was good at step 810. It should be noted that typically subsequent tests will be compared against the validated benchmark, although it is not required to be so compared. In addition, comparing subsequent tests to a validated benchmark typically results in time savings, as the additional test fluid and/or elevated test pressure is then typically held for a shorter period of time, such as 5 minutes, as compared to the time that the test fluid and/or elevated test pressure is held during the initial or benchmark test. If the calculated leak detection value is less than or equal to the benchmark and/or within a certain amount of the benchmark, the test is declared good at box 820, which then points to decision box or step 765 in which it must be determined if more tests are to be performed as previously described. If the leak detection value at decision step 810 falls outside the range of acceptable values as compared to the validated benchmark, then the method returns to step 750 as previously described.

Other methods of comparing subsequent leak detection values to the initial or validated benchmark leak detection values include comparing an average leak detection value across the entire time interval for a given series of multiple tests, and subtracting that average from the average value of a specific test over the same interval. Another option is to subtract the leak detection values of the benchmark test at a specific time interval from the subsequently calculated leak detection value of another test at the same time interval. Other methods of manipulating and displaying the leak detection values fall within the scope of the disclosure.

Instead of comparing the leak detection values to a validated benchmark as described in step 810, the leak detection values optionally can be compared to the minimum threshold, as noted at decision step or box 815, which is similar to box 740. If the leak detection value meets the minimum threshold, a good test and the flow chart also directs towards step 820. If the leak detection values do not meet the threshold, the method returns to step 750 as previously discussed.

Figure 10:
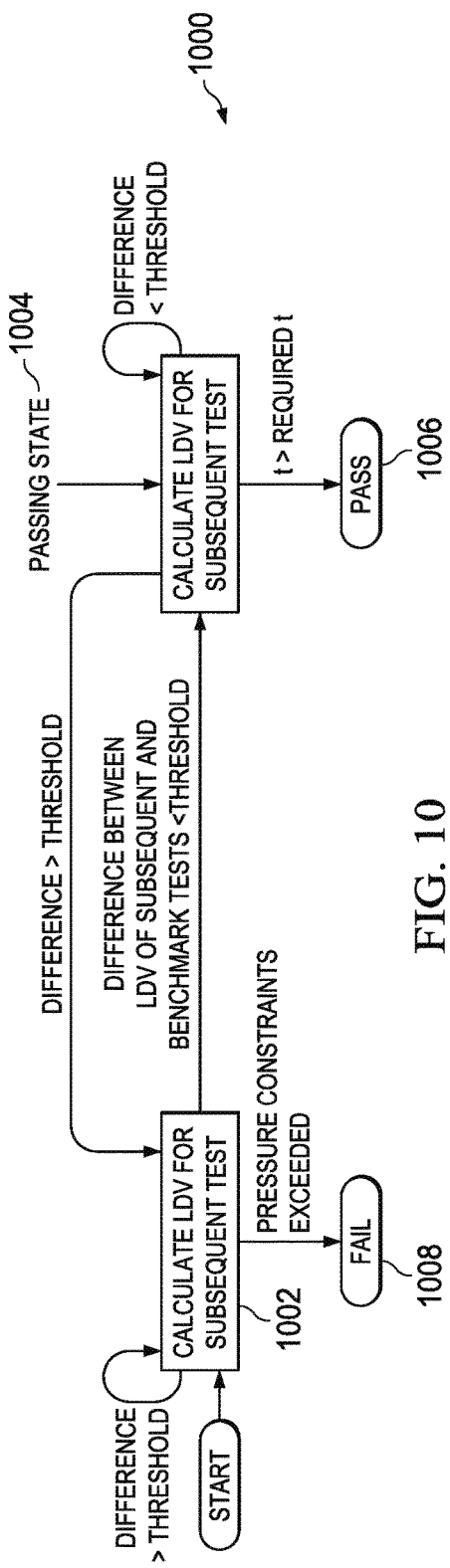
FIG. 10 is a flow chart of a method for comparing a subsequent leak detection test to a benchmark leak detection test in accordance with various embodiments.

Turning to FIG. 10, a method 1000 for comparing leak detection values is shown in accordance with various embodiments. The method 1000 begins in block 1002 with calculating a leak detection value for a subsequent leak detection test and entering a passing state in block 1004 if a difference between the leak detection value of the benchmark leak detection test and the leak detection value of the subsequent leak detection test is within a predetermined threshold. In some embodiments, the threshold may be based on a percentage value of one of the leak detection values while in other embodiments, the threshold may be a fixed or absolute value. The method 1000 remains in the passing state 1004 provided that the difference remains within (i.e., less than or less than or equal to) the predetermined threshold. If the difference exceeds the predetermined threshold, the method 1000 continues with exiting the passing state and continuing to compare the leak detection values in block 1002. However, if the difference remains within the predetermined threshold for at least a predetermined time period (e.g., 5 minutes), the method 1000 continues to block 1006 where a passing indication is generated, for example for display on the display device 25 or for transmittal via a network such as Internet 27 to another computing device 28 or another display device. Further, if pressure constraints are exceeded while in block 1002, a failing indication may be generated in block 1008. For example, a failing indication 1008 may be generated if pressure data indicates that the pressure value of the system 5 has fallen out of a predetermined range (e.g., the pressure of the pressure system 5 is below a minimum pressure value). Alternately, the method 1000 may include generating a failing indication in block 1008 if the leak detection value is outside of a predetermined range.

In other embodiments, the results of the benchmark leak detection test and the subsequent leak detection test includes a pressure slope value for each test. Similar to the leak detection values, the pressure slope values may also be compared to determine whether the subsequent test has passed and that a leak is not present in the pressure system. The pressure slope values may be generated by, for example, performing a two-point evaluation on pressure data received from a pressure sensor, applying a linear regression to the pressure data, or fitting a curve to the pressure data and calculating a derivative of the curve.

Figure 11:
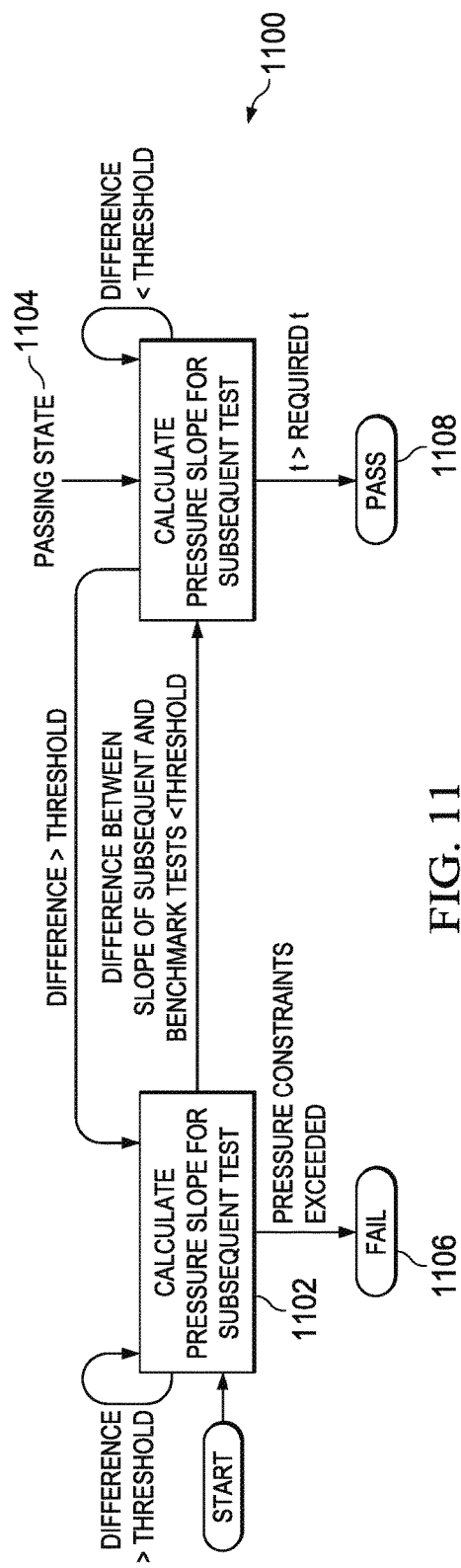
FIG. 11 is another flow chart of a method for comparing a subsequent leak detection test to a benchmark leak detection test in accordance with various embodiments.

Turning to FIG. 11, a method 1100 for comparing pressure slope values is shown in accordance with various embodiments. The method 1100 begins in block 1102 with calculating a pressure slope for a subsequent leak detection test and entering a passing state in block 1104 if a difference between the pressure slope value of the benchmark leak detection test and the pressure slope value of the subsequent leak detection test is within a predetermined threshold. In some embodiments, the threshold may be based on a percentage value of one of the pressure slope values while in other embodiments, the threshold may be a fixed or absolute value. The method 1100 remains in the passing state 1104 provided that the difference remains within (i.e., less than or less than or equal to) the predetermined threshold. If the difference exceeds the predetermined threshold, the method 1100 continues with exiting the passing state and continuing to compare the pressure slope values in block 1102. However, if the difference remains within the predetermined threshold for at least a predetermined time period (e.g., 5 minutes), the method 1100 continues to block 1108 where a passing indication is generated, for example for display on the display device 25 or for transmittal via a network such as Internet 27 to another computing device 28 or another display device. Further, if pressure constraints are exceeded while in block 1102, a failing indication may be generated in block 1106. For example, a failing indication 1106 may be generated if pressure data indicates that the pressure value of the system 5 has fallen out of a predetermined range (e.g., the pressure of the pressure system 5 is below a minimum pressure value). Alternately, the method 1100 may include generating a failing indication in block 1106 if the pressure slope is outside of a predetermined range.

Two examples of the system and method of leak detection will be described below and with reference to FIGS. 2-6.

Both examples refer to data acquired at a well site, in particular, a deepwater well in which the blowout preventer and, more specifically, various subcomponents of the blowout preventer that can be hydraulically isolated from the other components, are tested for leaks and pressure integrity. It should be noted that while the two examples relate to blowout preventer and oil and gas drilling, the scope of the disclosure extends to other pressure systems as described above.

Figure 2:
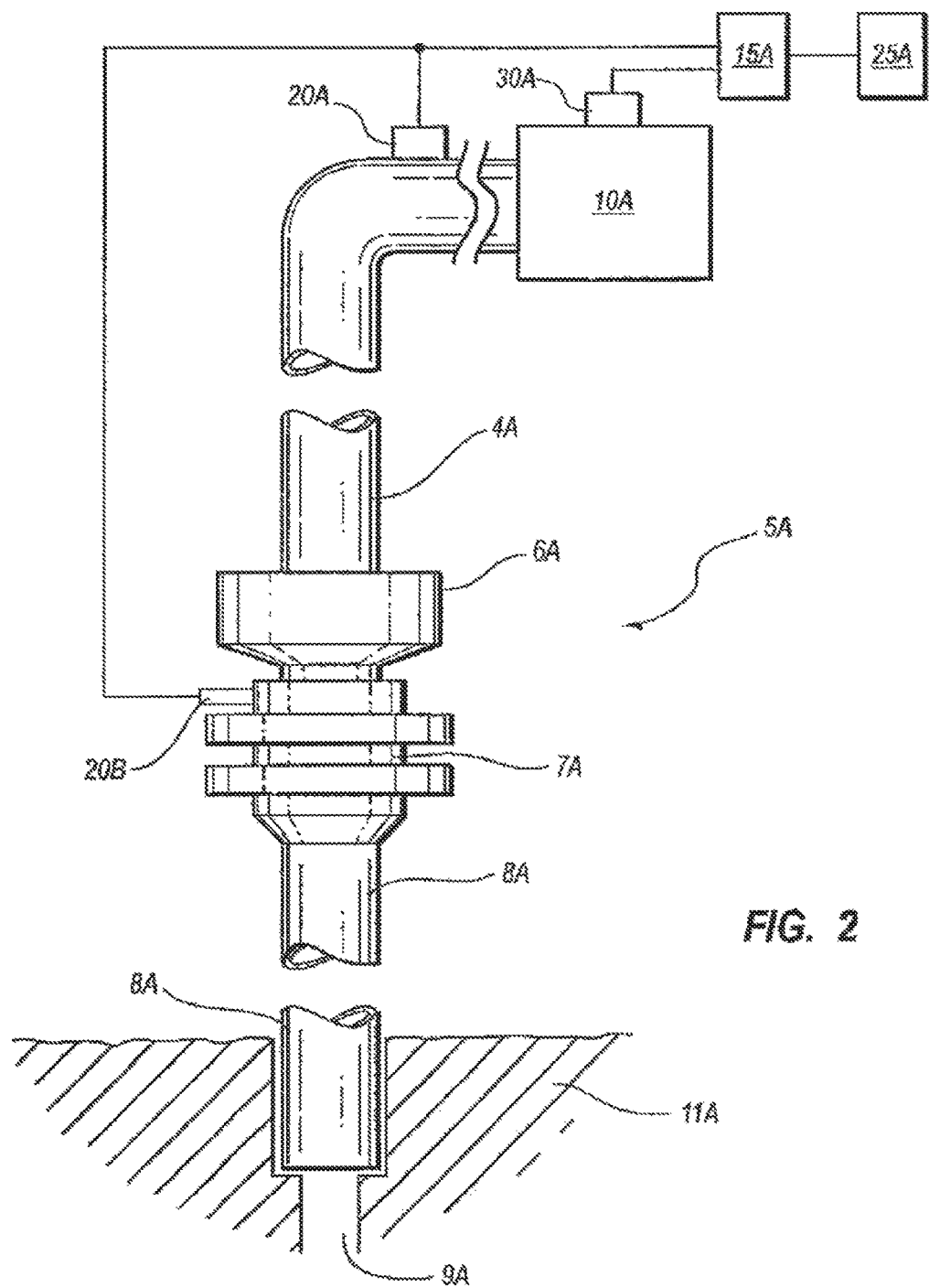
FIG. 2 is an example of an embodiment of the leak detection system used to test a blowout preventer on an oil rig.

FIG. 2 is a representation of an embodiment of the leak detection system and includes a pressure system 5A that includes, in this example, flow line 4A (which may be one or more flow lines) that are configured to couple a fluid pumping unit 10A, typically a cementing unit when on a drilling rig, to one or more annular rams 6A and one or more shear rams and/or pipe rams 7A. Additionally, while the examples do not extend to testing the following components, FIG. 2 also illustrates the casing 8A, open well bore 9A, and the formation or geological structure/rock 11A that surrounds the open well bore 9A. As previously noted, the method and system described herein extends to these elements for leak detection and pressure integrity testing.

Also illustrated in FIG. 2 is a flow meter or flow sensor 30A coupled to a general purpose computer 15A that includes an operating program and computer readable medium, as previously described. Also illustrated are two pressure sensors 20A and 20B coupled to the pressure system 5A, one at the surface and one at the blowout preventer. Other pressure sensors may be located at the same or different locations of the pressure system 5A and fall within the scope of the disclosure. The pressure sensors 20A and 20B shown are coupled to the general purpose computer 15A as described above. A graphical output 25A comparable to that described above, is coupled to the general purpose computer 15A.

Example 1

Figure 3:
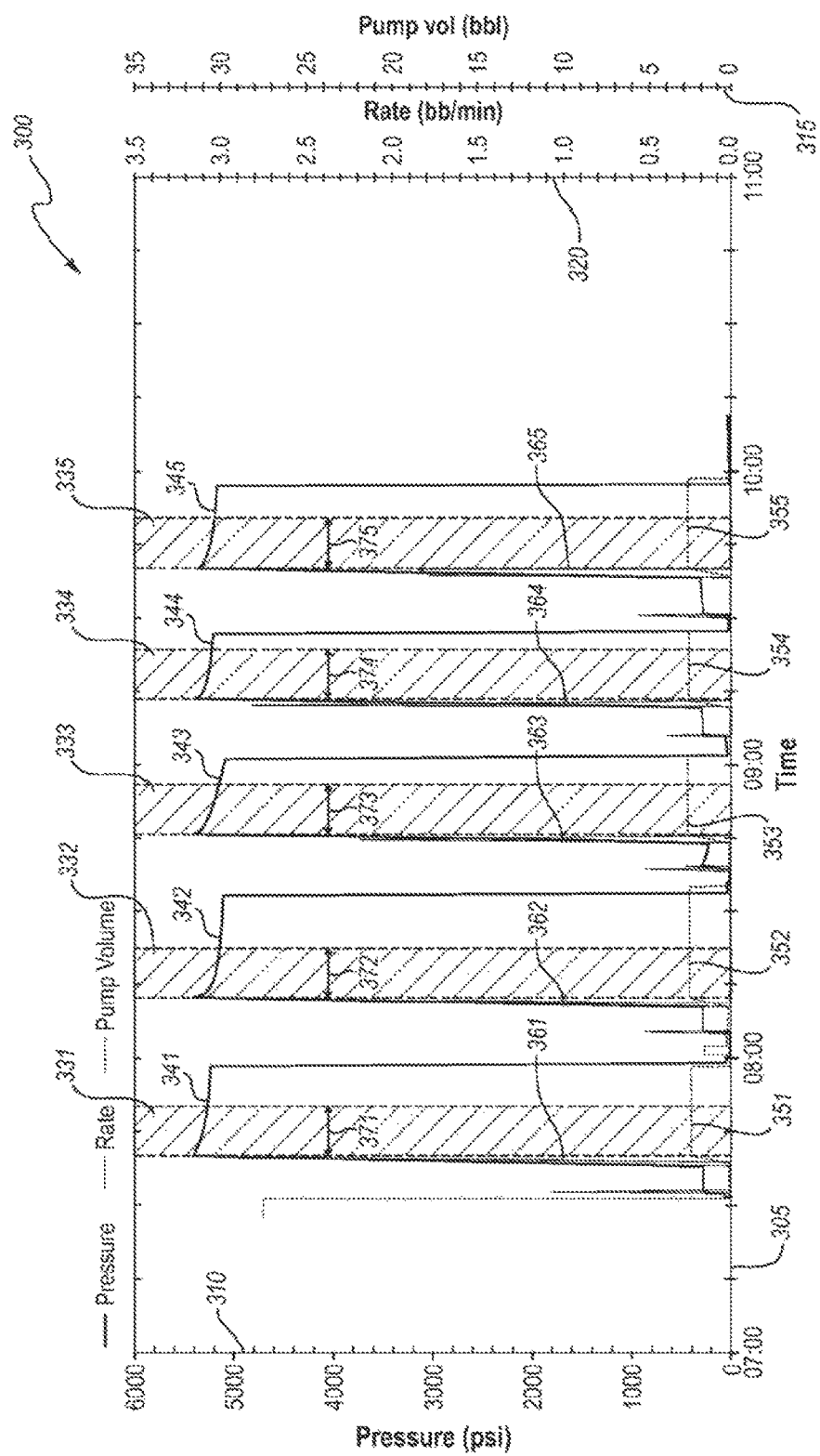
FIG. 3 is an example of a plot of actual raw data created by an embodiment of the disclosure.

Pressure, flow rate, and the volume of test fluid pumped are graphed on the chart 300 in FIG. 3, which illustrates a series of high pressure tests to several subcomponents of the blowout preventer illustrated in FIG. 2. It is likely that some of the subcomponents are the same type so that the volume pumped for the test of such subcomponents will be effectively the same, as will be explained below. For example, a typical blowout preventer has several pipe rams, each of which must be hydraulically isolated and tested separately in accordance with various testing requirements. The pipe rams are typically identical from a mechanical standpoint, so the volume of fluid pumped will be the same leading to similar test results if there are no leaks or defects. Other components of the blowout preventer that optionally can be tested with the methods and systems described herein include, but are not limited to, the manifold, choke lines and kill lines.

The abscissa (e.g., horizontal axis), is the time axis 305, which shows or plots time on an hourly basis, with the gradations marking 15 minute increments. The left vertical or ordinate axis is a pressure axis 310 showing the pressure of the pressure system 5 (FIG. 1) as measured by the pressure sensor 20, and includes increments or gradations for every 1,000 pounds per square inch (psi) with minor gradations marking 200 psi increments. The right ordinate is also known as the flow rate axis 320 and presents the rate at which the test fluid is pumped by the fluid pumping unit 10 (FIG. 1) as measured by the flow sensor 30 and/or as calculated by the operating program as noted above. The flow rate axis 320 has major gradations for every 0.5 barrels per minute (bbl/min), or 21 gallons per minute, with minor gradations for every 0.1 bbl/min. The right ordinate axis is also called the test fluid volume axis 315 and shows the total test fluid volume pumped by the fluid pumping unit 10 as measured by the flow sensor 30 and/or as calculated by the operating program as noted above. The test fluid volume axis 315 has gradations for every barrel and minor gradations for every 0.2 barrels of total volume of test fluid pumped.

Five separate leak detection tests, 331, 332, 333, 334, and 335 are plotted on the chart 300 typically on the graphical display 25 (FIG. 1). Test 331 output includes the ordinate pressure test axis 310 to present the measured/sensed pressure 341 against the time axis 305. Also, the measured/calculated test fluid volume 351 is plotted over time using the time axis 305 against the test fluid volume axis 315. The test fluid flow rate 361 read against the flow rate axis 320, and the ti . . . 11le (time$_0$ to time$_{(n+1)}$) over which the leak detection value for test 331 is calculated as indicated by span 371. In other words, the span 371 indicates the time interval time$_0$ to timeD+1 over which the leak detection value is detected, with the initial time$_0$ occurring at the start of the span 371, the span 371 being divided into the various intervals to time$_{(n+1)}$. This process, as discussed above and illustrated in FIGS. 7 and 8, is repeated for each test.

Test 332 includes the measured/sensed pressure 342 read against the pressure axis 310 versus the time axis 305. Similarly, the measured/calculated test fluid volume 352 is plotted using the test fluid volume axis 315 and the time axis 305. The test fluid flow rate 362 is depicted using the flow rate axis 320 versus the time axis 305. The time (time$_0$ to time$_{(n+1)}$) over which the leak detection value is calculated for test 332 as indicated by span 372.

Test 333 shows the measured/sensed pressure 343 using the pressure axis 310 and the time axis 305. The measured/calculated test fluid volume 353 is plotted using the test fluid volume axis 315 against the time axis 305. The test fluid flow rate 363 is plotted using the flow rate axis 320 and the time axis 305. Of course the time (time$_0$ to time$_{(n+1)}$) over which the leak detection value is calculated for test 333 is indicated by span 373.

Test 334 similarly includes the measured/sensed pressure 344 plotting the read against the pressure axis 310 against the time axis 305. The measured/calculated test fluid volume 354 is plotted using the volume axis 320 and the time axis 305 The test fluid flow rate 364 is shown plotted using the flow rate axis 320 and the time axis 305. The time (time$_0$ to time$_{(n+1)}$) over which the leak detection value is calculated for test 334 is indicated by span 374.

Test 335 includes the measured/sensed pressure 345 read using the pressure axis 310 and the time axis 30. The measured/calculated test fluid volume 355 is plotted using the test fluid volume axis 315 and the time axis 305. The test fluid flow rate 365 is plotted using the flow rate axis 320 and the time axis 305. Of course the time (time$_0$ to time$_{(n+1)}$) over which the leak detection value is calculated for test 335 is indicated by span 375.

It will be noted that the total test fluid volume pumped 351,352,353,354, and 355 for each test is effectively the same. Thus, the data suggests that the tests 331, 332, 333, 334, and 335 are for mechanically similar components, such as for a series of pipe rams in the blowout preventer and as discussed previously.

Each of the measured pressure curves 341, 342, 343, 344, and 345 indicate a general exponential decay in the pressure as time passes, as discussed previously. The difficulty is to distinguish the normal and unharmful decrease in pressure from a loss or decrease in pressure that is reflective of a leak. Thus, the values of the pressure, as visually represented in curves 341, 342, 343, 344, and 345, are used as data or input values to calculate leak detection values as described above.

Figure 4:
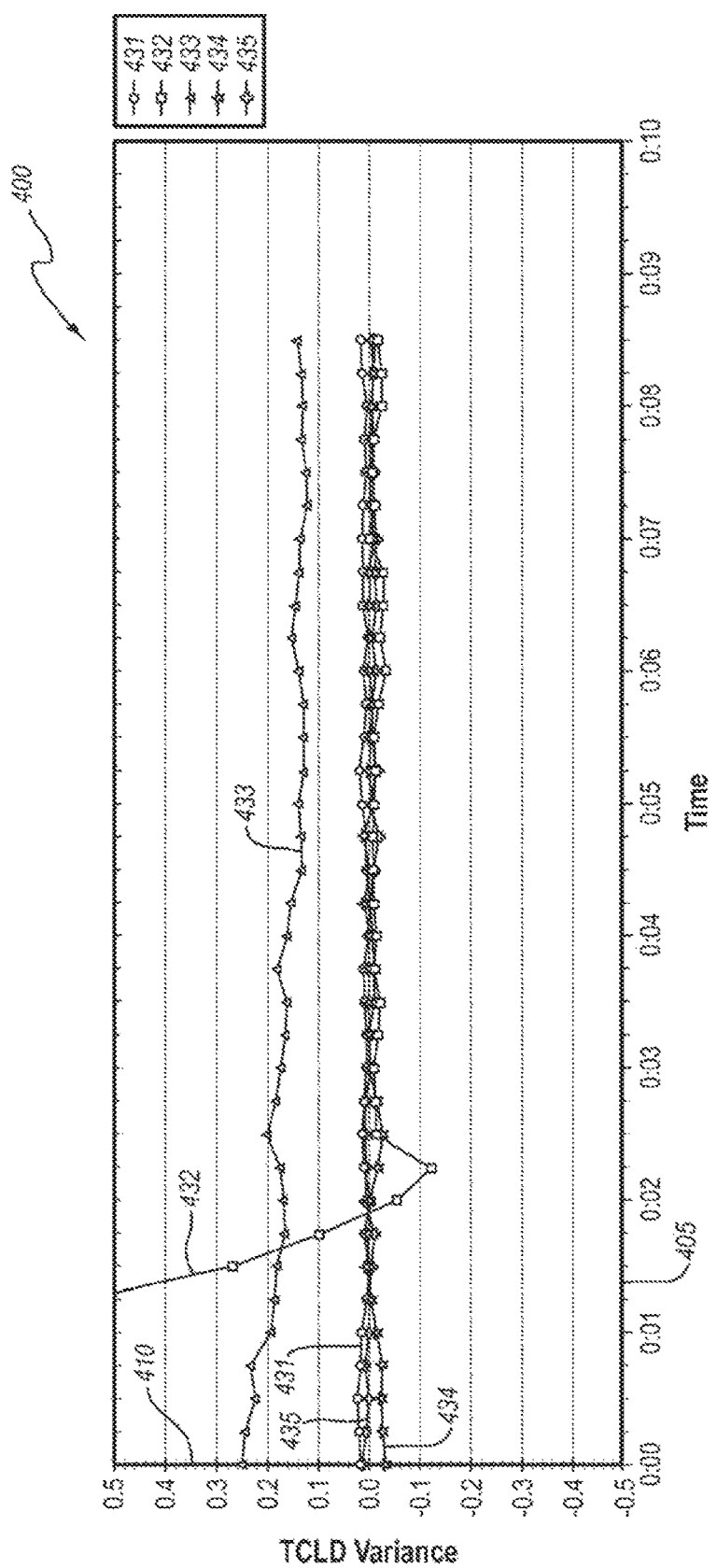
FIG. 4 is an example of a plot of a series of leak detection values calculated from the raw data plotted in FIG. 3.

The graph or chart 400 of leak detection values 431, 432, 433, 434, and 435, that correspond with the leak detection tests 331, 332, 333, 334, and 335 over the time intervals 371, 372, 373, 374, and 375 are plotted in chart 400 in FIG. 4. The leak detection values are calculated in accordance with the method and the system as described above. The abscissa or horizontal time axis 405 has major gradations for every minute and minor gradations for every 15 seconds. The leak detection value axis 410 is the vertical or ordinate axis and, as previously, noted, is a unitless value with major gradations every 0.1 unit and minor gradations for every 0.02 units.

It is very apparent from chart 400 that leak detection values 431, 434, and 435 corresponding to tests 331, 334, and 335 in FIG. 3 are all around zero, indicating that the decrease in pressure is a result of the expecting thermal effect/decrease in temperature of the test fluid and the compressibility effect, rather than a leak.

On the other hand, leak detection values 432 and 433 have a significantly different character when plotted on chart 400 as compared to the leak detection values 431, 434, and 435. Thus, whether establishing a minimum threshold leak detection value of 0.1 for example, or comparing the leak detection values 432 and 433 against the other leak detection values 431, 434, and 435, which are good and usable as a benchmark, the slopes or graphs associated with leak detection values 432 and 433 indicate clearly that the pressure system tested in 332 and 333 differs dramatically from the others 431,434 and 435. This difference suggests there is failure of the system 5 and that it is leaking. As before, the pressure system tested at 332 suffered a small, leaking valve early in the test, which was then closed, resulting in a leak detection value 432 that quickly returned to the pattern set by leak detection values 431, 434, and 435. The pressure system tested at 333 having a leak detection value curve of 433 suffered a slow leak in the system and, therefore, failed as a whole.

It should be noted that the conclusions reached about integrity of the system (i.e., leak or no leak) can be made quickly based on the leak detection values 431, 432, 433, 434, and 435. In the examples, the determination can be made in a period of time under 10 minutes. It is believed that reliable data and a relatable determination can be made in as little as 3-5 minutes; and in some systems, the determination can be made even in a period of less than 1 minute. As can be seen from the pressure data plotted in curves 341, 342, 343, 344, and 345 in FIG. 3, if each test would have been continued for approximately another 5 to 8 minutes until the pressure and test fluid were bled off would be unnecessary. In other words, over a period of five longer tests an additional 25 to 40 minutes of time would be spent testing the pressure systems; and that time would have been unnecessary if the present leak detection systems and methods were used.

Thus, example 1 illustrates that the system and method of leak detection as herein disclosed is fast and reliably indicative of defects.

Example 2

Figure 5:
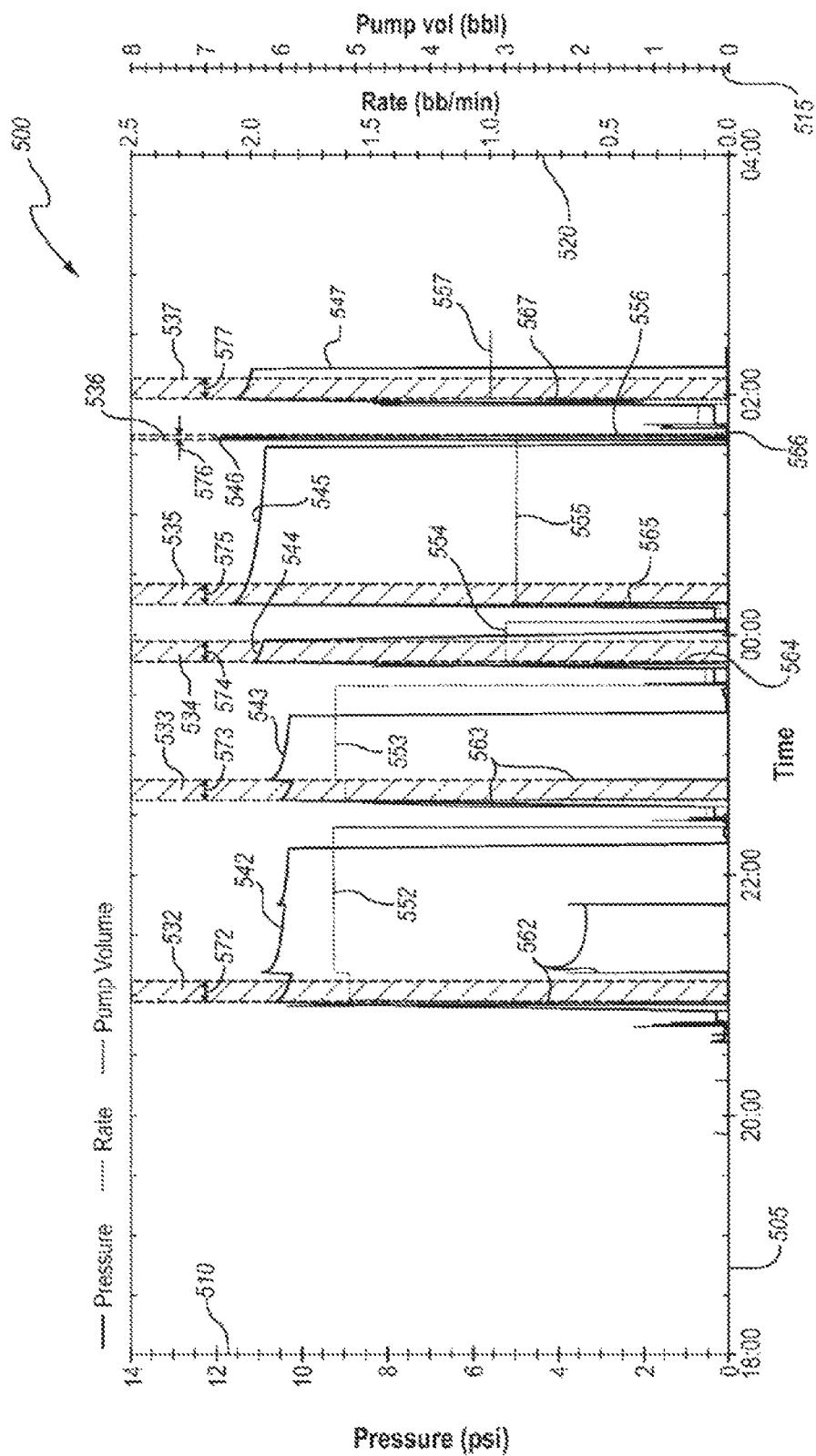
FIG. 5 is an example of a plot of actual raw data created by an embodiment of the disclosure.
Figure 6:
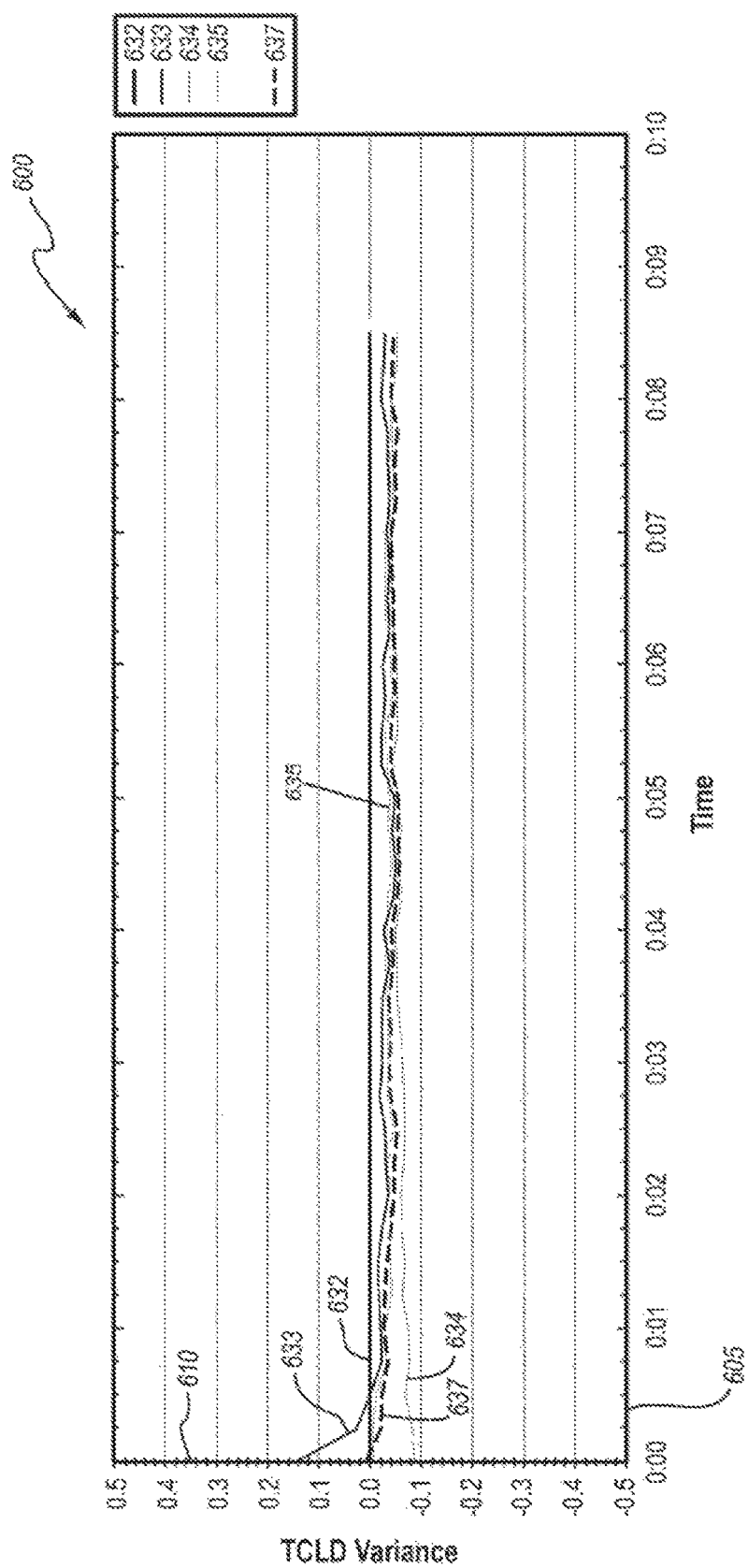
FIG. 6 is an example of a plot of a series of leak detection values calculated from the raw data plotted in FIG. 5.

Example 2, as illustrated in the charts 500 and 600 in FIGS. 5 and 6, respectively, use data from tests of several different subcomponents of the blowout preventer that is significantly more noisy than that used in Example 2.

In FIG. 5, abscissa or horizontal axis is also called the time axis 505 which shows time with major gradations or intervals every two hours and minor intervals or gradations in 30 minute increments. The ordinate or left vertical axis can be called the pressure axis 510 which reflects the pressure of the pressure system 5 (FIG. 1) as measured by the pressure sensor 20. The pressure axis 510 has major gradations or intervals for every 2,000 pounds per square inch (psi) with minor gradations or intervals marking 500 psi increments. The ordinate or right vertical flow rate axis 520 shows the rate at which the test fluid is pumped by the fluid pumping unit 10 as measured by the flow sensor 30 and/or as calculated by the operating program as noted above. The flow rate axis 520 has major gradations or intervals for every 0.5 barrels per minute (bbl/min), or 21 gallons per minute, with minor gradations between the major showing 0.1 bbl/min. The vertical test fluid volume axis 515 indicates the total test fluid volume pumped by the fluid pumping unit 10 as measured by the flow sensor 30 and/or as calculated by the operating program as noted above and has major gradations or intervals for every barrel and minor gradations or intervals for every intervening 0.2 barrels of the total volume of test fluid pumped.

Six separate leak detection tests, 532, 533, 534, 535, 536, and 537 are plotted on the chart 500. Test 532 includes the measured/sensed pressure 542 on the pressure axis 510 read against the time axis 505. The measured/calculated test fluid volume 552 is plotted from axis 515 against the time axis 505. The test fluid flow rate 562 from axis 520 is plotted against the time axis 505. The time (time$_0$ to time$_{(n+1)}$) over which the leak detection value is calculated for test 532 as indicated by time span 572.

Test 533 includes the measured/sensed pressure 543 on the pressure axis 510 read against the time axis 505. The measured/calculated test fluid volume 553 is plotted from axis 515 against time axis 505. The test fluid flow rate 563 from axis 520 is plotted against the time axis 505. The time (time$_0$ to time$_{(n+1)}$) over which the leak detection value is calculated for test 533 is indicated by span 573.

Test 534 includes the measured/sensed pressure 544 on the pressure axis 510 read against the time axis 505. The measured/calculated test fluid volume 554 is plotted from axis 515 against time axis 505. The test fluid flow rate 564 from axis 520 is plotted against the time axis 505. The time (time$_0$ to time$_{(n+1)}$) over which the leak detection value is calculated for test 534 is indicated by span 574.

Test 535 includes the measured/sensed pressure 545 on the pressure axis 510 read against the time axis 505. The measured/calculated test fluid volume 555 is plotted from axis 515 against the time 505. The test fluid flow rate 565 from axis 520 is plotted against the time axis 505. The time (time$_0$ to time$_{(n+1)}$) over which the leak detection value is calculated for test 535 is indicated by span 575.

Test 536 includes the measured/sensed pressure 546 on the pressure axis 510 read against the time axis 505. The measured/calculated test fluid volume 556 is plotted from axis 515 against time axis 505. The test fluid flow rate 566 from axis 520 is plotted against the time axis 505. The time (time$_0$ to time$_{(n+1)}$) over which the leak detection value is calculated for test 536 as indicated by span 576. It should be noted that the data from test 536 appears to be indicate that the test was aborted.

Test 537 includes the measured/sensed pressure 547 on the pressure axis 510 read against the time axis 505. The measured/calculated test fluid volume 557 is plotted from axis 515 against the time axis 505. The test fluid flow rate 567 from axis 520 is plotted against the time axis 505. The time (time$_0$ to time$_{(n+1)}$) over which the leak detection value is calculated for test 537 is indicated by span 577.

It will be noted that the total test fluid volume pumped 552 and 553 in tests 532 and 533 are nearly the same. Thus, the data suggest that the tests 532 and 533 are for mechanically similar components, such as for a series of annular rams in the blowout preventer as discussed previously. Similarly, the total test fluid volume pumped 554, 555, 556, and 557 are nearly the same. Thus, the data suggest that the tests 534, 535, 536, and 537 are also for mechanically similar components, such as, for example, a series of pipe rams in the blowout preventer as discussed previously. Of course, and as previously discussed, the data for these components tested are merely exemplary; and the systems and methods disclosed herein are capable of testing other components of the blowout preventer, as well as different pressure systems as explained above.

Each of the measured pressure curves 542, 543, 544, 545, 546, and 547 show a general exponential decay in the pressure as time passes. This reflects, in part, a change in temperature as discussed previously. As before stated, the it is important to differentiate between the normal decrease in pressure from a decrease in pressure relating to a problem such as a potentially harmful leak. Thus, the values of the pressure, as visually represented in curves 542, 543, 544, 545,546, and 547 are used as data input values to calculate leak detection values as described above. Further, it should be noted that in tests 532 and 533, it is believed that additional test fluid was added to the pressure system 5, raising the pressure as the pressure curves 532 and 533 indicate. The flow rate curves 562 and 563 and volume curves 552 and 553 also indicate this. Regardless of the reason for adding the additional fluid, chart 600 of the calculated leak detection values will illustrate that the presently disclosed method and systems quickly and more easily allow identification of good tests (not leaking) from leaking pressure systems.

The chart 600 of the leak detection values 632, 633, 634, 635, and 637 that correspond with the leak detection tests 532, 533, 534, 535, 536, and 537 over the time intervals 572, 573, 574, 575, 576, and 577 are plotted in chart 600 in FIG. 6. The leak detection values are calculated in accordance with the method and using the system as described above. The abscissa or horizontal time axis 605 has major gradations for every minute and minor gradations for every 15 seconds in between the minutes. The leak detection value axis 610 is the ordinate or vertical axis and, as previously noted, may be valueless with major gradations every 0.1 units and minor gradations indicating 0.02 units.

By inspecting the chart 600 it can be seen that notwithstanding the different volumes used in the tests leading to curves 552, 553, 554, 555, 556, and 557 and pressures 542, 543, 544, 545, 546, and 547 for the respective tests, each of the leak detection values 632, 633, 634, 635, and 637 all fall within the range 0.0 to negative 0.08 (−0.08) within the first 30 seconds of the test and hold relatively constant over the next 8.5 minutes. Thus, it can be seen that none of the tests indicate the existence of a leak when compared to the character of the leak detection values 532 and 533 of FIG. 5 that reflect a defect such as a leak. It can also be seen that embodiments of the presently disclosed method and system work accurately despite sometimes poor and/or inconsistent data, such as that created by spurious signals and/or improper procedures and/or with inexperienced fluid pumping unit operators.

It should also be noted that for purposes of the validation, test 532 and leak detection value or curve 632 was selected as a benchmark as typically would be the case when conducting the test in real-time at a well site. The remaining tests show good correlation of the leak detection values.

It should also be noted that the leak detection values 634, 635, and 637 (as previously noted, test 536 appears to have been aborted quickly) of the different subcomponents of the blowout prevent show good correlation with the leak detection values 632 and 633 of the subcomponents leak tested in 532 and 533. Thus, it can be observed that the leak detection values provide consistent response despite the different subcomponent systems being tested.

Further, it is observed that the leak detection values 431, 432, 433, 434, and 435 fell in a range of approximately ±0.02 after 30 seconds for tests 331, 332, 333, 334, and 335 that occurred at pressures 341, 342, 343, 344, and 345 of between approximately 5,000 psi to 5,400 psi.

In comparison, it is observed that the leak detection values 632, 633, 634, 635, and 637 fell in a range of approximately 0 to about 0.08 after 30 seconds for tests 532, 533, 534, 535, and 537 that occurred at pressures 541, 542, 543, 544, 545, 547 of between approximately 10,300 psi to 11,500 psi. It should be noted that at high pressures, the pressure sensors like sensor 20, typically experience higher noise and reduced accuracy. In short, they are less accurate and produce a less stable output. The lack of stability impacts on the leak detection value and likely accounts for a portion of the difference in the values between the two examples. Thus, despite the significant difference in testing pressure, the leak detection values each fall within the range of ±0.1, which can be selected as an optional, general threshold value for the leak detection.

Turning back to FIGS. 5 and 6, it should be noted that the system and method operates so that the determination of whether there is a malfunction such as a leak can be made based on the leak detection values 632, 633, 634, 635, and 637 in under 10 minutes and, in many instances, less than that. However, normal pressure testing shows pressure data plotted in curves 542, 543, 544,545, and 547 in FIG. 5 for tests that continued from a minimum of about 15 minutes to approximately 1.5 hours. To test the whole system, the operator would consume following the procedures of the prior art, at least 4.25 hours. In other words, the present leak detection systems and methods disclosed herein yield significant savings in time and in turn in money.

Example 3

The use of the embodiments of the methods and systems disclosed herein are not limited to pressure systems that operate at pressures of several thousand pounds per square inch. Indeed, the methods and systems disclosed can be used, as noted, for pressure systems that operate at pressures that are orders of magnitude lower than the previous examples, including, but not limited to, low-pressure tests for the systems disclosed above, such as low pressure fluid lines, laboratory equipment, and the like.

A further advantage of embodiments of the methods and systems disclosed is that they have the capability of measuring and validating pressure tests and detecting leaks on pressure systems that undergo a first pressure test at a first pressure and subsequently undergo a second pressure test at a second pressure. The second pressure optionally is significantly different than the first pressure and, optionally, the second pressure is orders of magnitude higher or lower than the first pressure. A disadvantage of the prior art is that resolution of the data and methods of presenting the data makes the validation of widely divergent test data quite difficult and, in some instances, impossible. For example, an analog circular chart recorder used in prior art methods typically has a scale from 0 to 15,000 psi, with major gradations of 1,000 psi and minor gradations of 250 psi. Such a scale may be appropriate for high pressure tests of several thousand psi, but the resolution is unacceptable with low pressure tests of a few hundred psi.

Figure 9:
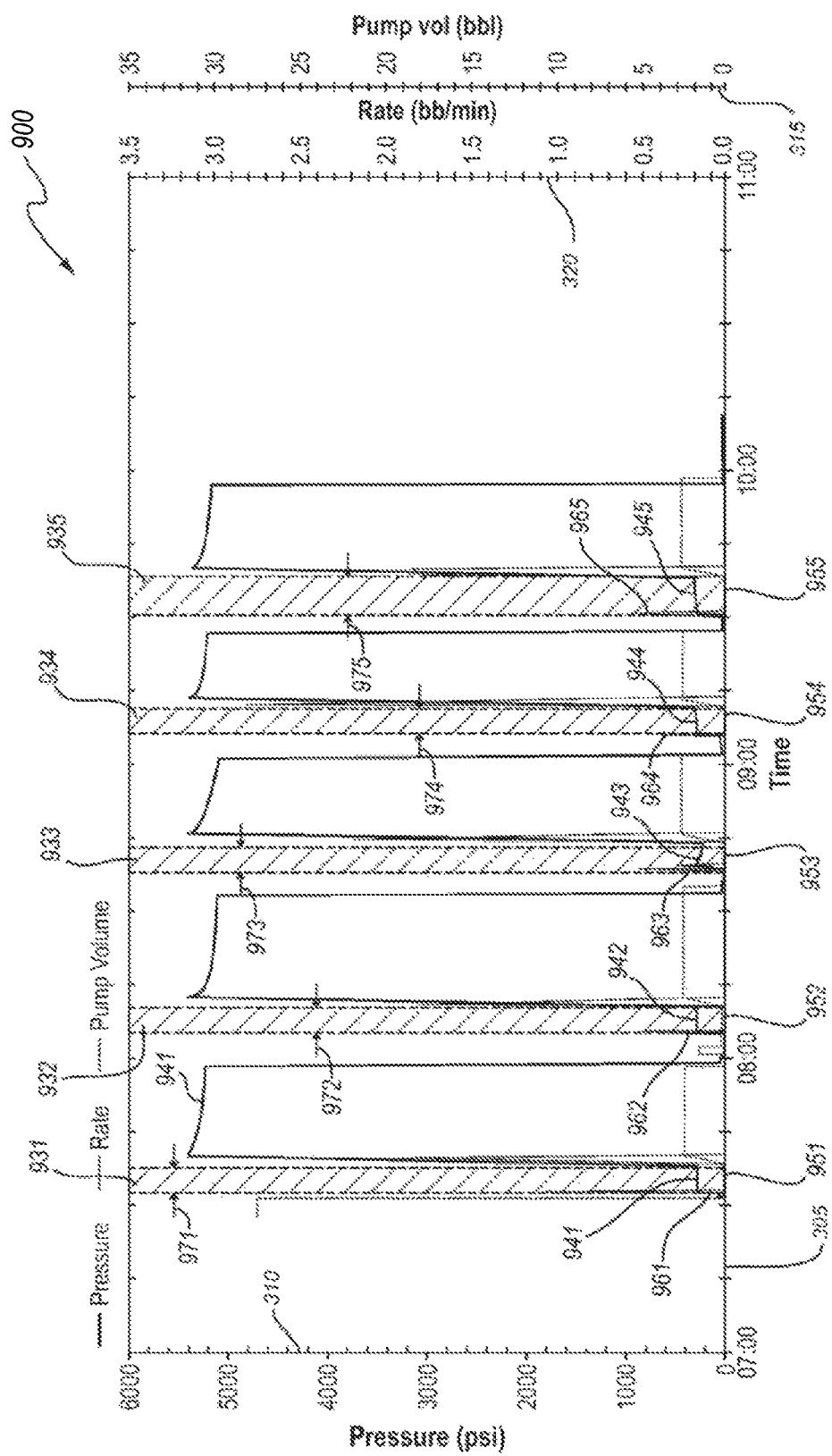
FIG. 9 is the example of a plot of actual raw data in FIG. 3 with different and additional aspects noted as they relate to another embodiment of the disclosure.

Turning to Example 3, illustrated in the chart 900 in FIG. 9. More specifically, FIG. 9 plots the same data from tests of several different subcomponents of the blowout preventer demonstrated in FIG. 3. That is, FIGS. 3 and 9 are the same chart with the same data, but FIG. 3 provides element numbers and a discussion of a high pressure test of the components, whereas FIG. 9 provides element numbers and a discussion of a series of low pressure tests that preceded each of the high pressure tests.

For clarity and to avoid clutter, FIGS. 3 and 9 repeat only a few common elements rather than all of the elements common to each chart. More specifically, the abscissa or horizontal axis is the time axis 305. The time axis has larger units of time on an hourly basis, with the minor gradations for 15 minute increments. The ordinate or left vertical axis is the pressure axis 310 which shows the pressure of the pressure system 5 (FIG. 1) as measured by the pressure sensor 20. The left vertical axis show major gradations for every 1,000 pounds per square inch (psi) with minor gradations between the major gradations marking 200 psi increments. The flow rate axis 320 reflects the rate at which the test fluid is pumped by the fluid pumping unit 10 as measured by the flow sensor 30 and/or as calculated by the operating program as noted above. The flow rate axis 320 has major gradations for every 0.5 barrels per minute (bbl/min), or 21 gallons per minute, with minor gradations in between marking every 0.1 bbl/min. The test fluid volume axis 315 indicates the total test fluid volume pumped by the fluid pumping unit 10 as measured by the flow sensor 30 and/or as calculated by the operating program as noted above and has major gradations or units for every barrel and minor gradations or units for every 0.2 barrels of total volume of test fluid pumped.

FIG. 9 plots five separate low pressure leak detection tests, 931, 932, 933, 934, and 935 are plotted on the chart 900. Each of the low pressure tests 931, 932, 933, 934, and 935 precedes in time the high pressure tests 331, 332, 333, 334, and 335, respectively, that were discussed with respect to Example 1 and FIG. 3.

Returning to FIG. 9, low pressure test 931, 932, 933, 934 and 935 each show the measured/sensed pressure 941, 942, 943, 944 and 945 respectively read against the pressure 305. The measured/calculated test fluid volume 951 is plotted using the volume axis 315 against the time axis 305. The test fluid flow rates 961, 962, 963, 964, and 965 are plotted using the axis 320 against or using the time 305. The time (time$_0$ to time$_{(n+1)}$) over which the leak detection value is calculated is indicated by spans 971, 972, 973, 974 and 975, respectively.

It will be noted that the total test fluid volume pumped 951, 952, 953, 954, and 955 for each low pressure test is effectively the same. That is, the data suggests that the low pressure tests 931, 932, 933, 934, and 935 are for mechanically similar components, as discussed above in Example 1.

As discussed in Example 1, each of the measured pressure curves 341, 342, 343, 344, and 345 in FIG. 3 indicate a general exponential decay in the pressure as time passes. Further, and as noted, it is the difficulty in distinguishing the normal and unharmful decrease in pressure from a potentially harmful leak.

In the instance of the low pressure tests, it should be noted that the resolution, particularly of the pressure 941, 942, 943, 94, and 945 against the pressure axis 310 in FIG. 9 is relatively poor compared to the resolution of the pressure curves 341, 342, 343, 344, and 345 in FIG. 3 when viewed on the common scale of pressure axis 310. That is, the resolution of the pressure 941, for example, appears relatively constant at about 250 psi, which is in sharp contrast to the resolution for high pressure curve 341 in FIG. 3 which reflects a change in pressure of nearly 250 psi. The presently disclosed methods and systems can optionally display a pressure axis 310 (as well as other axis date) with a user selected and/or pre-selected range of data and, therefore, provide better resolution for a specific range of data for a given test. Nonetheless, one scale may be adequate for a given data set, but rarely will that same scale provide sufficient resolution for another data set, particularly with analog prior art methods that have fixed data ranges for which the data are plotted.

The same method and systems discussed above in Example 1 and elsewhere can be applied to the low pressure tests. That is, a leak detection value is calculated for each low pressure test just as it is for the high pressure test and, optionally, graphically displayed just as the leak detection values 431, 432, 433, 434, and 435 were displayed in FIG. 4.

A further application and benefit of the disclosed methods and systems accrue in the particular scenario in which a low pressure test precedes a high pressure test. The ability to detect a leak during the low pressure test, something not possible given the resolution and capability of prior art methods, permits a user of the present disclosure to take remedial action to investigate and/or to stop a leak following a the low pressure test and before preceding to the high pressure test phase. Taking preventive or remedial action at the low pressure test phase reduces risk to equipment that might fail catastrophically under high pressures; reduces risk to personnel that might otherwise be in the area of the equipment or pressure systems during which the pressure systems fail while they undergo a high pressure test; reduces the risk to the environment should the pressure systems otherwise fail while they undergo a high pressure test; and reduces the time to detect the leak because a leak could potentially be discovered at the low pressure stage before undertaking the time and money to conduct a high pressure test.

The one or more present disclosures, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure.

While the examples present data from a blowout preventer on a drilling rig, it is understood that embodiments of the presently disclosed system and method of detecting leaks work equally well for pressure systems and fluid systems of other types, as disclosed and discussed above. Thus, the examples provided are non-limiting examples.

The present disclosures, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for testing a pressure system, comprising:
   receiving data from a pressure sensor, the data indicative of a first pressure of the pressure system at a first time and a second pressure of the pressure system at a second time;
   generating a pass/fail indication as a result of whether a percentage change in pressure from the first pressure to the second pressure is below a threshold; and
   physically manipulating a component of the pressure system in response to the pass/fail indication.

2. The method of claim 1, wherein the pass/fail indication comprises an indication on a graphical output of a failure or that a leak is present as a result of the percentage change in pressure from the first pressure to the second pressure being above the threshold.

3. The method of claim 1, wherein the pass/fail indication comprises an indication on a graphical output of a pass or that a leak is not present as a result of the percentage change in pressure from the first pressure to the second pressure being below the threshold.

4. The method of claim 1, further comprising receiving a user input and, as a result, beginning a test of the pressure system.

5. The method of claim 1, further comprising receiving data from a pump indicative of a flow rate of the pump and, as a result, beginning a test of the pressure system.

6. The method of claim 1, wherein the pressure system comprises a blowout preventer.

7. A method for testing a pressure system, comprising:
   receiving data from a pressure sensor, the data indicative of a first pressure of the pressure system at a first time and a second pressure of the pressure system at a second time, wherein a physical configuration of the pressure system between the first and second times is static;
   generating an indication of a test outcome as a result of whether a leak detection value comprising a ratio of the first pressure and the second pressure is below a threshold, and
   physically adjusting a component of the pressure system in response to the indication of the test outcome.

8. The method of claim 7, wherein the test outcome comprises an indication on a graphical output of a failure or that a leak is present as a result of the leak detection value being above the threshold.

9. The method of claim 7, wherein the test outcome comprises an indication on a graphical output of a pass or that a leak is not present as a result of the leak detection value being below the threshold.

10. The method of claim 7, further comprising receiving a user input and, as a result, beginning a test of the pressure system.

11. The method of claim 7, further comprising receiving data from a pump indicative of a flow rate of the pump and, as a result, beginning a test of the pressure system.

12. The method of claim 7, wherein the pressure system comprises a blowout preventer.

13. A non-transitory computer-readable medium comprising instructions that, when executed by a processor, cause the processor to:
   receive data from a pressure sensor indicative of a first pressure of a pressure system at a first time and a second pressure of the pressure system at a second time;
   generate a pass/fail indication as a result of whether a percentage change in pressure from the first pressure to the second pressure is below a threshold; and
   cause a component of the pressure system to be physically manipulated based on the pass/fail indication.

14. The non-transitory computer-readable medium of claim 13 wherein the pass/fail indication comprises an indication on a graphical output of a failure or that a leak is present as a result of the percentage change in pressure from the first pressure to the second pressure being above the threshold.

15. The non-transitory computer-readable medium of claim 13 wherein the pass/fail indication comprises an indication on a graphical output of a pass or that a leak is not present as a result of the percentage change in pressure from the first pressure to the second pressure being below the threshold.

16. The non-transitory computer-readable medium of claim 13 wherein the instructions, when executed, further cause the processor to receive a user input and, as a result, begin a test of the pressure system.

17. The non-transitory computer-readable medium of claim 13 wherein the instructions, when executed, further cause the processor to receive data from a pump indicative of a flow rate of the pump and, as a result, begin a test of the pressure system.

18. A non-transitory computer-readable medium comprising instructions that, when executed by a processor, cause the processor to:
   receive data from a pressure sensor indicative of a first pressure of the pressure system at a first time and a second pressure of the pressure system at a second time, wherein a physical configuration of the pressure system is static between the first and second times;
   generate an indication of a test outcome as a result of whether a leak detection value comprising a ratio of the first pressure and the second pressure is below a threshold; and
   cause a component of the pressure system to be physically adjusted in response to the indication of the test outcome.

19. The non-transitory computer-readable medium of claim 18 wherein the test outcome comprises an indication on a graphical output of a failure or that a leak is present as a result of the leak detection value being above the threshold.

20. The non-transitory computer-readable medium of claim 18 wherein the test outcome comprises an indication on a graphical output of a pass or that a leak is not present as a result of the leak detection value being below the threshold.

21. The non-transitory computer-readable medium of claim 18 wherein the instructions, when executed, further cause the processor to receive a user input and, as a result, begin a test of the pressure system.

22. The non-transitory computer-readable medium of claim 18 wherein the instructions, when executed, further cause the processor to receive data from a pump indicative of a flow rate of the pump and, as a result, begin a test of the pressure system.

* * * * *